United States Patent
Chen et al.

(10) Patent No.: US 10,334,563 B2
(45) Date of Patent: Jun. 25, 2019

(54) METHOD FOR REALIZING DEVICE-TO-DEVICE COMMUNICATION RELAY SELECTION, NETWORK CONTROL NODE AND USER EQUIPMENT

(71) Applicant: ZTE CORPORATION, Shenzhen, Guangdong Province (CN)

(72) Inventors: Lin Chen, Shenzhen (CN); Shuanshuan Wu, Shenzhen (CN); Bo Dai, Shenzhen (CN); Guanghui Yu, Shenzhen (CN); Feng Xie, Shenzhen (CN); Ying Huang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/538,661

(22) PCT Filed: Dec. 15, 2015

(86) PCT No.: PCT/CN2015/097471
§ 371 (c)(1),
(2) Date: Jun. 22, 2017

(87) PCT Pub. No.: WO2016/101808
PCT Pub. Date: Jun. 30, 2016

(65) Prior Publication Data
US 2017/0347338 A1  Nov. 30, 2017

(30) Foreign Application Priority Data
Dec. 22, 2014 (CN) .......................... 2014 1 0810609
May 15, 2015 (CN) .......................... 2015 1 0251322

(51) Int. Cl.
*H04W 4/00* (2018.01)
*H04W 4/50* (2018.01)
(Continued)

(52) U.S. Cl.
CPC ............. *H04W 72/02* (2013.01); *H04W 4/00* (2013.01); *H04W 8/005* (2013.01); *H04W 24/10* (2013.01);
(Continued)

(58) Field of Classification Search
CPC ..... H04W 8/005; H04W 40/22; H04W 76/14; H04W 88/04; H04W 92/18; H04W 76/23
See application file for complete search history.

(56) References Cited

U.S. PATENT DOCUMENTS 8,270,337 B2 * 9/2012 Yu ...................... H04B 7/15542
370/315
9,185,745 B2 * 11/2015 Ghosh ................... H04W 88/04
(Continued)

FOREIGN PATENT DOCUMENTS

CN 102547881 A 7/2012
CN 102780993 A 11/2012
(Continued)

OTHER PUBLICATIONS

ETRI, Discussion on Relaying for D2D Proximity Services, 3GPP TSG-RAN WG2 Meeting #83, Barcelona, Spain, Aug. 19-23, 2013. R2-132592.
(Continued)

*Primary Examiner* — Eric Nowlin
(74) *Attorney, Agent, or Firm* — Ling Wu; Stephen Yang; Ling and Yang Intellectual Property

(57) ABSTRACT

Provided are a method for realizing device-to-device communication relay selection, a network control node and user equipment. The method includes: a network control node receiving relay-related information sent by user equipment and determining a relay node; and the network control node sending device-to-device communication relay configuration information to the determined relay node. In the tech-
(Continued)

nical solution, by sending relay-related information in a network to perform selection or configuration of a relay node, a corresponding solution is provided for a scenario for which relay selection is not provided, and thereby the selection of the relay node is realized.

13 Claims, 11 Drawing Sheets

(51) Int. Cl.
H04W 8/00 (2009.01)
H04W 24/10 (2009.01)
H04W 72/00 (2009.01)
H04W 72/02 (2009.01)
H04W 76/14 (2018.01)
H04W 88/04 (2009.01)

(52) U.S. Cl.
CPC ......... *H04W 72/005* (2013.01); *H04W 76/14* (2018.02); *H04W 4/50* (2018.02); *H04W 88/04* (2013.01)

(56) References Cited

U.S. PATENT DOCUMENTS

| | | | |
|---|---|---|---|
| 9,538,501 B2* | 1/2017 | Fukuta | H04W 72/02 |
| 9,565,608 B2* | 2/2017 | Badic | H04W 76/14 |
| 9,674,877 B2* | 6/2017 | Tong | H04W 16/26 |
| 9,713,072 B2* | 7/2017 | Liao | H04W 4/023 |
| 9,781,556 B2* | 10/2017 | Johnsson | H04W 72/042 |
| 9,867,027 B2* | 1/2018 | Chuang | H04W 8/005 |
| 9,936,482 B2* | 4/2018 | Jung | H04W 72/02 |
| 10,177,834 B2* | 1/2019 | Basu Mallick | H04B 7/15557 |
| 2011/0268004 A1 | 11/2011 | Doppler et al. | |
| 2013/0273926 A1 | 10/2013 | Peng et al. | |
| 2014/0023008 A1* | 1/2014 | Ahn | H04L 5/006 370/329 |
| 2014/0301289 A1* | 10/2014 | Johnsson | H04W 72/042 370/329 |
| 2014/0328329 A1* | 11/2014 | Novlan | H04W 72/042 370/336 |
| 2014/0357269 A1* | 12/2014 | Zhou | H04W 76/14 455/434 |
| 2015/0029866 A1* | 1/2015 | Liao | H04W 4/023 370/241 |
| 2015/0087233 A1* | 3/2015 | Kim | H04W 76/023 455/41.2 |
| 2015/0319796 A1* | 11/2015 | Lu | H04B 7/2615 370/330 |
| 2016/0183040 A1* | 6/2016 | Hua | H04W 4/02 455/404.2 |
| 2016/0205665 A1* | 7/2016 | Fukuta | H04W 72/02 455/454 |
| 2016/0212682 A1* | 7/2016 | Chung | H04W 76/14 |
| 2016/0227518 A1* | 8/2016 | Li | H04W 72/042 |
| 2016/0286374 A1* | 9/2016 | Baghel | H04W 76/14 |
| 2016/0286450 A1* | 9/2016 | Badic | H04W 76/14 |
| 2016/0286471 A1* | 9/2016 | Zisimopoulos | H04W 48/16 |
| 2016/0330603 A1* | 11/2016 | Chuang | H04B 7/15507 |
| 2016/0381720 A1* | 12/2016 | Baek | H04W 8/14 370/329 |
| 2017/0013595 A1* | 1/2017 | Jung | H04W 72/02 |
| 2017/0048906 A1* | 2/2017 | Lee | H04W 76/14 |
| 2017/0163470 A1* | 6/2017 | Seo | H04W 76/14 |
| 2017/0208636 A1* | 7/2017 | Agiwal | H04W 8/00 |
| 2017/0280469 A1* | 9/2017 | Park | H04W 24/10 |
| 2017/0317740 A1* | 11/2017 | Basu Mallick | H04B 7/15557 |
| 2017/0359116 A1* | 12/2017 | Hwang | H04W 40/12 |
| 2017/0359766 A1* | 12/2017 | Agiwal | H04W 76/14 |
| 2017/0359835 A1* | 12/2017 | Seo | H04B 7/14 |
| 2017/0367027 A1* | 12/2017 | Wu | H04W 40/10 |
| 2017/0374575 A1* | 12/2017 | Kahtava | H04W 48/16 |
| 2018/0027429 A1* | 1/2018 | Li | H04W 40/22 455/426.1 |
| 2018/0041605 A1* | 2/2018 | Zhang | H04W 4/70 |
| 2018/0041889 A1* | 2/2018 | Chen | H04W 40/02 |
| 2018/0054725 A1* | 2/2018 | Agiwal | H04W 8/005 |
| 2018/0070281 A1* | 3/2018 | Wu | H04W 88/04 |
| 2018/0098370 A1* | 4/2018 | Bangolae | H04W 76/14 |
| 2018/0115362 A1* | 4/2018 | Yasukawa | H04W 8/24 |
| 2018/0139682 A1* | 5/2018 | Xu | H04W 88/04 |
| 2018/0139694 A1* | 5/2018 | Folke | H04W 48/20 |
| 2018/0139794 A1* | 5/2018 | Chae | H04W 40/12 |
| 2018/0146331 A1* | 5/2018 | Johnsson | H04W 72/042 |
| 2018/0146494 A1* | 5/2018 | Khoryaev | H04W 76/14 |
| 2018/0159616 A1* | 6/2018 | Aminaka | H04W 8/00 |
| 2018/0160338 A1* | 6/2018 | Huang | H04W 8/08 |
| 2018/0167988 A1* | 6/2018 | Jung | H04W 72/04 |
| 2018/0176805 A1* | 6/2018 | Lee | H04W 24/08 |
| 2018/0184436 A1* | 6/2018 | Ohtsuji | H04W 88/04 |
| 2018/0192458 A1* | 7/2018 | Aminaka | H04W 88/04 |
| 2018/0199390 A1* | 7/2018 | Hahn | H04W 76/15 |
| 2018/0242381 A1* | 8/2018 | Wei | H04W 76/14 |
| 2018/0255505 A1* | 9/2018 | Thyagarajan | H04W 8/005 |
| 2018/0373304 A1* | 12/2018 | Davis | G05B 15/02 |
| 2019/0014606 A1* | 1/2019 | Li | H04L 1/0003 |
| 2019/0036595 A1* | 1/2019 | Ohtsuji | H04W 40/12 |
| 2019/0037463 A1* | 1/2019 | Feng | H04W 88/04 |
| 2019/0053305 A1* | 2/2019 | Saiwai | H04W 76/14 |

FOREIGN PATENT DOCUMENTS

| | | | | |
|---|---|---|---|---|
| CN | 103607750 A | | 2/2014 | |
| CN | 103634812 A | | 3/2014 | |
| CN | 103731900 A | | 4/2014 | |
| CN | 103747507 A | | 4/2014 | |
| CN | 103906266 A | | 7/2014 | |
| CN | 104105155 A | | 10/2014 | |
| CN | 104159221 A | | 11/2014 | |
| CN | 105009477 A | * | 10/2015 | .......... H04W 72/042 |
| CN | 106131961 A | * | 11/2016 | ............ H04W 8/005 |
| EP | 2833694 A2 | * | 2/2015 | ............ H04W 4/023 |
| EP | 2833694 A3 | * | 4/2015 | ............ H04W 4/023 |
| EP | 3091765 A1 | * | 11/2016 | ............ H04W 8/005 |
| EP | 3229551 A1 | * | 10/2017 | |
| EP | 3235226 A1 | * | 10/2017 | ............. H04W 4/02 |
| EP | 3280209 A1 | * | 2/2018 | |
| KR | 20180014421 A | * | 2/2018 | ............. H04W 8/14 |
| WO | 2010006649 A1 | | 1/2010 | |
| WO | WO-2013095001 A1 | * | 6/2013 | .......... H04W 76/023 |
| WO | WO-2014165675 A1 | * | 10/2014 | .......... H04W 72/042 |
| WO | WO-2016089081 A1 | * | 6/2016 | ............ H04W 72/04 |
| WO | WO-2016100653 A1 | * | 6/2016 | ............. H04W 4/02 |
| WO | WO-2017003161 A1 | * | 1/2017 | ............. H04W 8/14 |

OTHER PUBLICATIONS

ITRI, Relay for Public Safety ProSe, SA WG2 Meeting #99, Sep. 23-27, 2013, Xiamen, P.R. China, 3GPP, SA WG2 TD. S2-133787.

* cited by examiner

METHOD FOR REALIZING DEVICE-TO-DEVICE COMMUNICATION RELAY SELECTION, NETWORK CONTROL NODE AND USER EQUIPMENT

TECHNICAL FIELD

The present disclosure relates to but not limited to a Device-to-Device, D2D, communication technology, in particular to a method, a network control node and user equipment for realizing device-to-device communication relay selection.

BACKGROUND

On one hand, with the development of wireless multimedia services, demands of people for high data rate and user experience are gradually increased and higher requirements are raised to system capacity and coverage of traditional cellular networks. On the other hand, application scenarios such as public security, social network, short-distance data share and local advertisement cause demands of people for Proximity Services (ProSe) such as understanding nearby people or things and communicating therewith to be gradually increased. Traditional cellular networks centered on base stations have obvious limitations in aspects such as high data rate and support of proximity services, and a D2D technology, which represents a new development direction of future communication technologies, emerges at the right moment under the background of these demands. The application of the D2D technology can reduce the burden of the cellular networks, decrease the battery power consumption of the user equipment, improve data rate, improve the robustness of network infrastructure and very well satisfy the requirements on the high data rate and proximity services. Current D2D is also called as ProSe or Sidelink Transmission.

The D2D technology can work on licensed bands or unlicensed bands and allow a plurality of user equipment supporting D2D functions, i.e., D2D User Equipment (D2D UE, also called as ProSe enabled UE) to perform direct discovery/direct communication under a situation that there is network infrastructure or there is no network infrastructure. Application scenarios of D2D mainly include three scenarios. FIG. 1 illustrates a schematic view of related D2D application scenarios. As illustrated in FIG. 1, in scenario 1, user equipment perform data interaction under the coverage of a cellular network and user plane data do not pass through network infrastructure; in scenario 2, UE in areas with weak/no coverage perform relay transmission, user equipment (such as UE4 illustrated in FIG. 1) with poor signal quality is allowed to communicate with a network through other adjacent user equipment (such as UE3) under network coverage, thereby operators are helped to expand the coverage and improve the capacity; and in scenario 3, devices directly communicate with one another, it mainly applied to situations such as earthquakes or emergencies when the cellular network cannot work normally, and for example, control planes and user planes between UE5, UE6 and UE7 perform one-hop or multi-hop data communication without passing through network infrastructure.

The D2D technology usually includes a D2D discovery technology and a D2D communication technology, herein the D2D discovery technology refers to a technology which is used for judging/determining whether user equipment are proximal. For related methods, D2D user equipment in scenario 1 discover each other mainly by sending or receiving discovery signals/information, and in scenario 2 and scenario 3, no corresponding solution is determined, i.e., no relay node selection solution is given.

SUMMARY

An embodiment of the present disclosure provide a method, a network control node and user equipment for realizing device-to-device communication relay selection, and can provide solutions for selection of relay nodes in scenario 2 and scenario 3.

An embodiment of the present disclosure provides a method for realizing device-to-device communication relay selection, including:

user equipment sending relay-related information used for determining a relay node to a network control node; and if the user equipment is determined as a relay node, the user equipment receiving device-to-device communication relay configuration information sent by the network control node.

Alternatively, the relay-related information includes:

an indication that the user equipment supports device-to-device communication relay; and/or a remaining power level of the user equipment; and/or a geographical location of the user equipment; and/or a device-to-device communication group to which the user equipment belongs; and/or a relay intention/interest/indication of the user equipment; and/or a relay usable time period of the user equipment; and/or a relay type interested and/or supported by the user equipment; and/or a measurement result of measurement performed by the user equipment to a serving cell and/or an adjacent cell; and/or relay seeking information sent by user equipment seeking the relay node monitored by the user equipment; and/or relay information sent by the relay node monitored by the user equipment; and/or a mobility state indication of the user equipment; and/or a relay transmitting-receiving capability of the user equipment; and/or a processing capability of the user equipment; and/or a relay charging demand of the user equipment; and/or a cellular service traffic of the user equipment; and/or a device-to-device communication service traffic of the user equipment; and/or a relay load state of the user equipment.

Alternatively, the network control node includes: a base station and/or a network element having a ProSe function and/or other network elements executing a device-to-device communication relay selection function.

Alternatively, when the relay-related information includes the relay usable time period of the user equipment, the relay usable time period of the user equipment includes: a time period at which the user equipment is usable for device-to-device communication relay;

when the relay-related information includes the relay type interested and/or supported by the user equipment, the relay type includes: UE-to-UE relay and/or UE-to-network relay;

when the relay-related information includes the measurement result of measurement performed by the user equipment to the serving cell and/or the adjacent cell, the measurement result includes: measurement values of measurement performed by the user equipment to Reference Signal Received Power RSRP, and/or Reference Signal Received Quality RSRQ, and/or Channel State Information-Reference Signal Received Power CSI-RSRP and/or Channel State Information-Reference Signal Received Quality CSI-RSRQ of the serving cell and/or the adjacent cell;

when the relay-related information includes the relay information sent by the relay node monitored by the user equipment, the relay information sent by the relay node monitored by the user equipment includes whether the user equipment monitors relay information sent by adjacent device-to-device communication relay user equipment;

when the user equipment monitors the relay information sent by the adjacent device-to-device communication relay user equipment, the relay information monitored by the user equipment further includes a monitored relay type of the adjacent device-to-device communication relay user equipment and/or a measurement result of measurement performed to the relay information of the adjacent device-to-device communication relay user equipment;

when the relay-related information includes the mobility state indication of the user equipment, the mobility state indication includes a moving speed indication;

when the relay-related information includes the relay transmitting-receiving capability of the user equipment, the relay transmitting-receiving capability of the user equipment includes: whether the user equipment has dedicated transceiver hardware for relay transmitting-receiving and/or whether the user equipment supports parallel device-to-device communication and cellular data transmitting/receiving;

when the relay-related information includes the processing capability of the user equipment, the processing capability of the user equipment includes: a hardware configuration capability or capability level of the user equipment, a difference reflecting a number of Central Processing Units CPU and/or a main frequency and/or an internal memory of the user equipment or data packet processing efficiency;

when the relay-related information includes the relay charging demand of the user equipment, the relay charging demand of the user equipment includes: price compensation per data unit or time unit expected by the user equipment for relay data forwarding;

when the relay-related information includes the cellular service traffic of the user equipment, the cellular service traffic of the user equipment includes: a current uplink and/or downlink cellular traffic of the user equipment;

when the relay-related information includes the device-to-device communication service traffic of the user equipment, the device-to-device communication service traffic of the user equipment includes: a current device-to-device communication discovery and/or communication data traffic of the user equipment;

when the relay-related information includes the relay load state of the user equipment, the relay load state of the user equipment includes: a relay forwarding data traffic of the user equipment and/or a relay forwarding load indication of the user equipment; and when the relay-related information includes the relay information sent by the relay node monitored by the user equipment, the relay information sent by the relay node monitored by the user equipment includes:

an identification of the relay node; and/or an indication that the user equipment supports device-to-device communication relay; and/or a remaining power level of the relay node; and/or a device-to-device communication group to which the relay node belongs; and/or a relay usable time period of the relay node; and/or a relay type of the relay node; and/or a mobility state indication of the relay node; and/or a relay transmitting-receiving capability of the relay node; and/or a processing capability of the relay node; and/or a relay charging demand of the relay node; and/or a cellular service traffic of the relay node; and/or a device-to-device communication service traffic of the relay node; and/or a relay load state of the relay node; and/or a serving cell identification of the relay node.

Alternatively, when the relay-related information includes the relay seeking information monitored by the user equipment, the relay seeking information sent by user equipment seeking the relay node monitored by the user equipment includes:

a number of the monitored user equipment seeking the relay node; and/or a user equipment identification of each monitored user equipment seeking the relay node; and/or a user equipment type; and/or a relay type sought by user equipment; and/or a communication target identification of user equipment; and/or whether the user equipment is capable of discovering a node corresponding to the communication target identification of the user equipment seeking the relay node; and/or a user equipment application type; and/or a user equipment priority, and/or communication target priority and/or application priority; and/or a measurement result of measurement performed by the user equipment to the user equipment seeking the relay node; and/or user equipment traffic and service quality demands; and/or a user equipment coverage state; and/or a user equipment serving cell identification.

Alternatively, when the relay-related information includes the type of the user equipment seeking the relay node, the type of the user equipment seeking the relay node includes public security Device-to-Device D2D user equipment and non-public security D2D user equipment;

when the relay-related information includes the communication target identification of the user equipment seeking the relay node, a communication target of the user equipment seeking the relay node includes: target user equipment and/or a target device-to-device communication group;

when the relay-related information includes the measurement result performed by the user equipment to the user equipment seeking the relay node, the measurement result performed by the user equipment to the user equipment seeking the relay node includes: signal intensity measurement performed by the user equipment to the relay seeking information sent by the user equipment seeking the relay node or measurement performed to a corresponding reference signal; and when the relay-related information includes the coverage state of the user equipment seeking the relay node, the coverage state of the user equipment seeking the relay node includes a covered state and a non-covered state.

Alternatively, when the relay-related information includes the traffic and service quality demands of the user equipment seeking the relay node, the relay-related information further includes:

a guaranteed bitrate, and/or guaranteed maximum bitrate, and/or guaranteed average bitrate, and/or overall traffic, and/or service quality type indication and/or priority corresponding to a service flow which needs to be relay-forwarded by the user equipment seeking the relay node.

Alternatively, the method previously further includes: the user equipment receiving request information, sent by the network control node, of the relay-related information or report configuration information of the relay-related information, and the user equipment sending the relay-related information according to the request information of the relay-related information or the report configuration information of the relay-related information.

Alternatively, before the user equipment sends the relay-related information to the network control node, the method further includes:

the user equipment receiving a relay reception resource pool and/or relay threshold information sent or preconfigured by the network control node through broadcasting; and the user equipment monitoring the relay reception resource pool and receiving relay information sent by adjacent relay nodes or relay node seeking information sent by adjacent user equipment; or the user equipment judging whether a relay threshold is satisfied according to the measurement result of measurement performed to the serving cell, and receiving relay information sent by adjacent relay nodes or adjacent user equipment or sending the relay-related information to the network control node only when the threshold is satisfied, herein the relay threshold information includes: a link quality measurement minimum threshold of serving cell, and/or a remaining power level threshold and/or a mobility state threshold.

Alternatively, the device-to-device communication relay configuration information includes:

configuration information about activation and/or setup, release and/or deactivation or modification of the relay node; and/or a relay identification, and/or relay type and/or relay time length/relay time period of the relay node, and/or relay node device-to-device communication transmission and reception resource configuration.

Alternatively, after the user equipment determined as a relay node receives the device-to-device communication relay configuration information sent by the network control node, the method further includes:

the user equipment executing activation and/or setup, release and/or deactivation or modification of a relay function of the determined relay node according to the device-to-device communication relay configuration information.

In another aspect, the present disclosure further provides a method for realizing device-to-device communication relay selection, including:

a network control node receiving relay-related information sent by user equipment and determining a relay node; and the network control node sending device-to-device communication relay configuration information to the determined relay node.

Alternatively, the step of determining a relay node includes:

the network control node performing relay node selection or configuration according to the relay-related information and determining user equipment which is selected or configured as a relay node as the relay node.

Alternatively, the relay-related information includes:

a remaining power level of the user equipment; and/or a geographical location of the user equipment; and/or a device-to-device communication group to which the user equipment belongs; and/or a relay intention/interest/indication of the user equipment; and/or a relay usable time period of the user equipment; and/or a relay type interested and/or supported by the user equipment; and/or a measurement result of measurement performed by the user equipment to a serving cell and/or an adjacent cell; and/or relay seeking information sent by user equipment seeking the relay node monitored by the user equipment; and/or relay information sent by the relay node monitored by the user equipment; and/or a mobility state indication of the user equipment; and/or a relay transmitting-receiving capability of the user equipment; and/or a processing capability of the user equipment; and/or a relay charging demand of the user equipment; and/or a cellular service traffic of the user equipment; and/or a device-to-device communication service traffic of the user equipment; and/or a relay load state of the user equipment.

Alternatively, the network control node includes: a base station and/or a network element having a ProSe function and/or other network elements executing a device-to-device communication relay selection function.

Alternatively, when the relay-related information includes the relay usable time period of the user equipment, the relay usable time period of the user equipment includes: a time period at which the user equipment is usable for device-to-device communication relay;

when the relay-related information includes the relay type interested and/or supported by the user equipment, the relay type includes: UE-to-UE relay and/or UE-to-network relay;

when the relay-related information includes the measurement result of measurement performed by the user equipment to the serving cell and/or the adjacent cell, the measurement result includes: measurement values of measurement performed by the user equipment to Reference Signal Received Power RSRP, and/or Reference Signal Received Quality RSRQ, and/or Channel State Information-Reference Signal Received Power CSI-RSRP and/or Channel State Information-Reference Signal Received Quality CSI-RSRQ of the serving cell and/or the adjacent cell;

when the relay-related information includes the relay information sent by the relay node monitored by the user equipment, the relay information sent by the relay node monitored by the user equipment includes whether the user equipment monitors relay information sent by adjacent device-to-device communication relay user equipment;

when the user equipment monitors the relay information sent by the adjacent device-to-device communication relay user equipment, the relay information monitored by the user equipment further includes a monitored relay type of the adjacent device-to-device communication relay user equipment and/or a measurement result of measurement performed to the relay information of the adjacent device-to-device communication relay user equipment;

when the relay-related information includes the mobility state indication of the user equipment, the mobility state indication includes a moving speed indication;

when the relay-related information includes the relay transmitting-receiving capability of the user equipment, the relay transmitting-receiving capability of the user equipment includes: whether the user equipment has dedicated transceiver hardware for relay transmitting-receiving and/or whether the user equipment supports parallel device-to-device communication and cellular data transmitting-receiving;

when the relay-related information includes the processing capability of the user equipment, the processing capability of the user equipment includes: a hardware configuration capability or capability level of the user equipment, a difference reflecting a number of Central Processing Units CPU and/or a main frequency and/or an internal memory of the user equipment or data packet processing efficiency;

when the relay-related information includes the relay charging demand of the user equipment, the relay charging demand of the user equipment includes: price compensation per data unit/time unit expected by the user equipment for relay data forwarding;

when the relay-related information includes the cellular service traffic of the user equipment, the cellular service traffic of the user equipment includes: a current uplink and/or downlink cellular traffic of the user equipment;

when the relay-related information includes the device-to-device communication service traffic of the user equipment, the device-to-device communication service traffic of the user equipment includes: a current device-to-device communication discovery and/or communication data traffic of the user equipment;

when the relay-related information includes the relay load state of the user equipment, the relay load state of the user equipment includes: a relay forwarding data traffic of the user equipment and/or a relay forwarding load indication of the user equipment; and when the relay-related information includes the relay information sent by the relay node monitored by the user equipment, the relay information sent by the relay node monitored by the user equipment includes:

an identification of the relay node; and/or a remaining power level of the relay node; and/or a device-to-device communication group to which the relay node belongs; and/or a relay usable time period of the relay node; and/or a relay type of the relay node; and/or a mobility state indication of the relay node; and/or a relay transmitting-receiving capability of the relay node; and/or a processing capability of the relay node; and/or a relay charging demand of the relay node; and/or a cellular service traffic of the relay node; and/or a device-to-device communication service traffic of the relay node; and/or a relay load state of the relay node; and/or a serving cell identification of the relay node.

Alternatively, when the relay-related information includes the relay seeking information monitored by the user equipment, the relay seeking information monitored by the user equipment includes:

a number of the monitored user equipment seeking the relay node; and/or a user equipment identification of each monitored user equipment seeking the relay node; and/or a user equipment type; and/or a relay type sought by user equipment; and/or a communication target identification of user equipment; and/or whether the user equipment is capable of discovering a node corresponding to the communication target identification of the user equipment seeking the relay node; and/or a user equipment application type; and/or a user equipment priority, and/or communication target priority and/or application priority; and/or a measurement result of measurement performed by the user equipment to the user equipment seeking the relay node; and/or user equipment traffic and service quality demands; and/or a user equipment coverage state; and/or a user equipment serving cell identification.

Alternatively, when the relay-related information includes the type of the user equipment seeking the relay node, the type of the user equipment seeking the relay node includes: public security Device-to-Device D2D user equipment and non-public security D2D user equipment;

when the relay-related information includes the communication target identification of the user equipment seeking the relay node, a communication target of the user equipment seeking the relay node includes: target user equipment and/or a target device-to-device communication group;

when the relay-related information includes the measurement result of measurement performed by the user equipment to the user equipment seeking the relay node, the measurement result of measurement performed by the user equipment to the user equipment seeking the relay node includes: signal intensity measurement performed by the user equipment to the relay seeking information sent by the user equipment seeking the relay node or measurement performed to a corresponding reference signal; and when the relay-related information includes the coverage state of the user equipment seeking the relay node, the coverage state of the user equipment seeking the relay node includes a covered state and a non-covered state.

Alternatively, when the relay-related information includes the traffic and service quality demands of the user equipment seeking the relay node, the relay-related information further includes:

a guaranteed bitrate, and/or guaranteed maximum bitrate, and/or guaranteed average bitrate, and/or overall traffic, and/or service quality type indication and/or priority corresponding to a service flow which needs to be relay-forwarded by the user equipment seeking the relay node.

Alternatively, the method previously further includes:

the network control node sending request information of the relay-related information or report configuration information of the relay-related information to the user equipment.

Alternatively, the report configuration information of the relay-related information includes that: the report of the relay-related information is event report or periodic report and one or more relay-related information needs to be reported.

Alternatively, before the network control node receives the relay-related information sent by the user equipment, the method further includes:

the user equipment receiving a relay reception resource pool sent or preconfigured by the network control node through broadcasting; and the user equipment monitoring the relay reception resource pool and receiving relay information sent by adjacent relay nodes or relay node seeking information sent by adjacent user equipment.

Alternatively, before the network control node receives the relay-related information sent by the user equipment, the network control node sends a relay reception resource pool and/or relay threshold information, herein the relay threshold information includes: a link quality measurement minimum threshold of serving cell, and/or a remaining power level threshold and/or a mobility state threshold.

Alternatively, after the network control node receives the relay-related information sent by the user equipment, the method further includes:

the network control node randomly selecting or releasing a relay node from user equipment supporting device-to-device communication relay; or the network control node judging whether user equipment needs to be selected or configured as a relay node according to a predefined rule;

performing relay node configuration or reconfiguration to the user equipment selected as the relay node; and when a relay node is reselected, releasing one or more relay nodes which do not satisfy a relay node selection requirement, herein the predefined rule includes that:

when user equipment supports a device-to-device communication relay function and has a relay intention/interest/indication, and/or a remaining power level is high, and/or a mobility state is low, and/or a cellular link quality is good, and/or a geographical location is located at an edge of a non-covered area, and/or a geographical location is located at an edge of a cell, and/or a processing capability is strong, and/or a charging requirement is low and/or a cellular and device-to-device communication service traffic is low, the user equipment is selected as a relay node; and when user equipment selected as a relay node does not have a relay intention/interest/indication any longer, and/or a remaining power level is low, and/or a mobility state is high, and/or a cellular link quality is poor, and/or a geographical location is not located at an edge of a non-covered area any longer, and/or a geographical location is located at a non-edge of a cell, and/or a processing capability is weak, and/or a charging requirement is high and/or a cellular and device-to-device communication service traffic is high, the relay node is released.

Alternatively, the device-to-device communication relay configuration information includes:

configuration information about activation and/or setup, release and/or deactivation or modification of the relay node; and/or a relay identification, and/or relay type and/or relay time length/relay time period of the relay node, and/or relay node device-to-device communication transmission and reception resource configuration.

Alternatively, after the network control nodes sends the device-to-device communication relay configuration information to the user equipment selected as the relay node, the method further includes:

the user equipment executing activation and/or setup, release and/or deactivation or modification of a relay function of the determined relay node according to the device-to-device communication relay configuration information.

In another aspect, the present disclosure further provides a method for realizing device-to-device communication relay selection, including:

user equipment receiving relay-related information; and the user equipment selecting or configuring the user equipment as a relay node.

Alternatively, before the user equipment receives the relay-related information, the method further includes:

the user equipment receiving a relay reception resource pool and/or relay threshold information sent or preconfigured by a network control node through broadcasting; and the user equipment judging whether a relay threshold is satisfied according to a measurement result of measurement performed to a serving cell, and if the relay threshold is not satisfied, selecting to not receive the relay-related information any longer, herein the relay threshold information includes: a link quality measurement minimum threshold of serving cell, and/or a remaining power level threshold and/or a mobility state threshold.

Alternatively, the step of selecting or configuring the user equipment as a relay node includes:

the user equipment monitoring the relay reception resource pool and judging whether there is relay-related information sent by adjacent relay nodes; and if there is relay-related information, receiving the relay-related information sent by adjacent relay nodes; and when the user equipment does not receive relay-related information sent by adjacent user equipment; or the received relay type sent by the adjacent user equipment is not a relay type supported by the user equipment, the user equipment selecting or configuring the user equipment as a relay node.

Alternatively, when the user equipment receives the relay-related information, the method further includes:

the user equipment monitoring the relay reception resource pool and judging whether there is relay seeking information sent by adjacent user equipment; if there is relay seeking information, receiving relay node seeking information sent by adjacent user equipment; and the user equipment selecting or configuring the user equipment as a relay node according to the monitored relay seeking information sent by the adjacent user equipment.

Alternatively, when the user equipment selects or configures the user equipment as a relay node, the method further includes:

the user equipment selecting or releasing a relay function of the user equipment according to a predefined rule and the received relay-related information, herein the predefined rule includes that:

when the user equipment supports a device-to-device communication relay function and has a relay intention/interest/indication, and/or a remaining power level is high, and/or a mobility state is low, and/or a cellular link quality is good, and/or a geographical location is located at an edge of a non-covered area, and/or a geographical location is located at an edge of a cell, and/or a processing capability is strong, and/or a charging requirement is low and/or a cellular and device-to-device communication service traffic is low, the user equipment configures a relay function of the user equipment and selects the user equipment as a relay node; and when the user equipment does not have a relay intention/interest/indication any longer, and/or a remaining power level is low, and/or a mobility state is high, and/or a cellular link quality is poor, and/or a geographical location is not located at an edge of a non-covered area any longer, and/or a geographical location is located at a non-edge of a cell, and/or a processing capability is weak, and/or a charging requirement is high and/or a cellular and device-to-device communication service traffic is high, the user equipment selects to release a relay function of the user equipment.

Alternatively, before the user equipment configures or releases the relay function of the user equipment, the method further includes:

a network control node sending relay judgment information as the predefined rule to the user equipment through broadcasting or dedicated signaling, herein the relay judgment information includes: an power level threshold requirement, and/or a mobility state requirement, and/or a geographical location requirement, and/or a processing capability requirement, and/or a cellular and device-to-device communication service traffic requirement and/or a cellular link quality requirement for use as a relay node, herein the cellular link quality requirement is determined according to whether a measurement value of measurement performed by the user equipment to RSRP or RSRQ of a serving cell and/or an adjacent cell satisfies a given threshold; and the geographical location requirement is determined according to whether a measurement value of measurement performed by the user equipment to the RSRP of the serving cell and/or the adjacent cell satisfies a given threshold.

Alternatively, after the user equipment selects or configures a relay node, the method further includes:

a relay configuration performed by a network control node to the user equipment being capable of overlaying an autonomous relay configuration of the user equipment.

In another aspect, the present disclosure further provides a method for realizing device-to-device communication relay selection, including:

user equipment sending an access relay request containing relay-related information to a network control node; and the user equipment receiving an access relay configuration sent by the network control node.

Alternatively, the access relay includes: a device-to-device communication relay device having a relay function and capable of forwarding data for the user equipment.

Alternatively, the access relay request includes:

an access relay node configuration request, and/or an access relay node release request and/or an access relay node update request.

Alternatively, the access relay request includes:

a requested relay type, a requested number of access relay nodes, a device-to-device communication group to which the user equipment belongs, a geographical location of the user equipment, and relay-related information, sent by a monitored relay node, of the relay node.

Alternatively, when the access relay request is an access relay node release request or an access relay node update request, the access relay request further includes configured access relay node identification information.

Alternatively, when the relay-related information is obtained by monitoring information sent by a relay node, the relay-related information sent by the relay node includes:

an identification of the relay node; and/or
a remaining power level of the relay node; and/or
a device-to-device communication group to which the relay node belongs; and/or
a relay usable time period of the relay node; and/or
a relay type supported by the relay node; and/or
a measurement result of relay information received by the relay node from user equipment; and/or
a mobility state indication of the relay node; and/or
a relay transmitting-receiving capability of the relay node; and/or
a processing capability of the relay node; and/or
a relay charging demand of the relay node; and/or
a coverage state of the relay node; and/or
a serving cell identification of the relay node; and/or
a minimum number of hops from the relay node to a network node; and/or
a relay load state of the relay node; and/or
an access forbidden state of the relay node; and/or
Public Land Mobile Network PLMN information of the relay node.

Alternatively, the step of obtaining the relay-related information by monitoring information sent by the relay node includes:

the user equipment receiving a relay reception resource pool sent or preconfigured by the network control node through broadcasting or dedicated signaling; and the user equipment monitoring the relay reception resource pool and acquiring the relay-related information sent by the relay node.

Alternatively, when the user equipment is not capable of acquiring the relay-related information sent by the relay node by monitoring the relay reception resource pool, the method further includes:

the user equipment sending a relay discovery message through broadcasting; and after an adjacent relay node monitors the relay discovery message, sending the relay-related information to the user equipment.

Alternatively, the access relay configuration includes: a relay identification of the access relay node, configuration of activation and/or setup, release and/or deactivation or modification of the access relay node, and/or device-to-device communication transmission and reception resource configuration.

Alternatively, after the user equipment receives the access relay configuration sent by the network control node, the method further includes:

the user equipment executing configured activation and/or setup, release and/or deactivation or modification of the access relay node according to the access relay configuration.

In another aspect, the present disclosure further provides a method for realizing device-to-device communication relay selection, including:

a network control node receiving an access relay request containing relay-related information sent by user equipment; and the network control node sending an access relay configuration to the user equipment.

Alternatively, the access relay includes: a device-to-device communication relay device having a relay function and capable of forwarding data for the user equipment.

Alternatively, the access relay request includes:

an access relay node configuration request, and/or an access relay node release request and/or an access relay node update request.

Alternatively, the access relay request includes:

a requested relay type, and/or a requested number of access relay nodes, and/or a device-to-device communication group to which the user equipment belongs, and/or a geographical location of the user equipment, and/or relay-related information, sent by a monitored relay node through broadcasting, of the relay node.

Alternatively, when the access relay request is an access relay node release request or an access relay node update request, the access relay request further includes configured access relay node identification information.

Alternatively, when the relay-related information is obtained by monitoring information sent by a relay node, the relay-related information includes:
an identification of the relay node; and/or
a remaining power level of the relay node; and/or
a device-to-device communication group to which the relay node belongs; and/or
a relay usable time period of the relay node; and/or
a relay type supported by the relay node; and/or
a measurement result of relay information received by the relay node from user equipment; and/or
a mobility state indication of the relay node; and/or
a relay transmitting-receiving capability of the relay node; and/or
a processing capability of the relay node; and/or
a relay charging demand of the relay node; and/or
a coverage state of the relay node; and/or
a serving cell identification of the relay node; and/or
a minimum number of hops from the relay node to a network node; and/or
a relay load state of the relay node; and/or
an access forbidden state of the relay node; and/or
Public Land Mobile Network PLMN information of the relay node.

Alternatively, the step of obtaining the relay-related information by monitoring information sent by the relay node includes:

the user equipment receiving a relay reception resource pool sent or preconfigured by the network control node through broadcasting or dedicated signaling; and the user equipment monitoring the relay reception resource pool and acquiring the relay-related information sent by the relay node.

Alternatively, when the user equipment is not capable of acquiring the relay-related information sent by the relay node by monitoring the relay reception resource pool, the method further includes:

the user equipment sending a relay discovery message through broadcasting; and after an adjacent relay node monitors the relay discovery message, sending the relay-related information to the user equipment.

Alternatively, before the network control node sends the access relay configuration to the user equipment, the method further includes:

the network control node judging a relay node adjacent to the user equipment according to the geographical location of the user equipment and acquiring the relay-related information corresponding to the adjacent relay node.

Alternatively, the step of acquiring the relay-related information corresponding to the adjacent relay node includes:

the network control node requesting the relay node to send the relay-related information through broadcasting or send the relay-related information through dedicated signaling.

Alternatively, before the network control node sends the access relay configuration to the user equipment, the method further includes:

the network control node selecting or configuring an access relay node for the user equipment according to the relay-related information.

Alternatively, the step of the network control node selecting or configuring an access relay node for the user equipment according to the relay-related information includes:

when the access relay request received by the network control node and sent by the user equipment is a relay release request, the network control node releasing the access relay configuration of the user equipment; and when the access relay request received by the network control node and sent by the user equipment is a relay update request, judging a relay type requested by the user equipment, finding out a set of relay nodes corresponding to the relay type and adjacent to the user equipment, and randomly selecting an access relay node for the user equipment; or the network control node configuring or reconfiguring one or more access relay nodes for the user equipment according to a predefined rule and relay-related information of the relay node.

Alternatively, the access relay configuration includes: a relay identification of the access relay node, configuration of activation and/or setup, release and/or deactivation or modification of the access relay node, and/or device-to-device communication transmission and reception resource configuration.

Alternatively, after the network control node sends the configuration of the access relay node to the user equipment, the method further includes:

the user equipment executing configured activation and/or setup, release and/or deactivation or modification of the access relay node according to the access relay node configuration.

In another aspect, the present disclosure further provides a method for realizing device-to-device communication relay selection, including:

user equipment receiving relay-related information sent by an adjacent relay node; and the user equipment selecting or configuring an access relay node.

Alternatively, before the user equipment receives the relay-related information, the method further includes:

the user equipment receiving a relay reception resource pool and/or a relay selection threshold sent or preconfigured by a network control node through broadcasting or dedicated signaling, herein the relay selection threshold includes: a relay selection minimum device-to-device communication link quality threshold, and/or a relay reselection device-to-device communication link threshold and/or a relay reselection hysteresis value; and when the user equipment has not selected an access node or the user equipment has already selected an access node but a measurement result of measurement performed by the user equipment to the relay-related information sent by the selected relay node is less than the relay reselection device-to-device communication link threshold, the user equipment monitoring the relay reception resource pool and receiving the relay-related information sent by the relay node, herein the relay-related information includes:
an identification of the relay node; and/or
a remaining power level of the relay node; and/or
a device-to-device communication group to which the relay node belongs; and/or
a relay usable time period of the relay node; and/or
a relay type supported by the relay node; and/or
a mobility state indication of the relay node; and/or a relay transmitting-receiving capability of the relay node; and/or a processing capability of the relay node; and/or a relay charging demand of the relay node; and/or a coverage state of the relay node; and/or a serving cell identification of the relay node; and/or a minimum number of hops from the relay node to a network node; and/or a relay load state of the relay node; and/or an access forbidden state of the relay node; and/or Public Land Mobile Network PLMN information of the relay node.

Alternatively, when the user equipment is not capable of receiving the relay-related information sent by the relay node by monitoring the relay reception resource pool, the method further includes:

the user equipment sending a relay discovery message through broadcasting; and after the relay node monitors the relay discovery message, sending the relay-related information.

Alternatively, the step of the user equipment selecting or configuring an access relay node includes:

the user equipment selecting or configuring an access relay node according to the relay-related information.

Alternatively, the step of the user equipment selecting or configuring an access relay node according to the relay-related information includes: when the user equipment has not selected an access relay node, the user equipment judging whether a measurement result of the relay-related information sent to the relay node is greater than a relay selection minimum device-to-device communication link quality threshold, and if the measurement result is less than the relay selection minimum device-to-device communication link quality threshold, excluding the relay node;

when the user equipment has already selected an access relay node, the user equipment adding a relay reselection hysteresis value to the measurement value of the selected access relay node, then ranking the measurement value added with the relay reselection hysteresis value and measurement results of all other monitored relay nodes, and reselecting a relay node ranked at the topmost place; and the user equipment configuring/reconfiguring one or more relay access nodes according to a predefined rule and acquired relay-related information.

Alternatively, after the user equipment selects or configures an access relay node according to the relay-related information of the user equipment, the method further includes:

an access relay configuration performed by the network control node to the user equipment being capable of overlaying an autonomous access relay node configuration of the user equipment.

Alternatively, before the user equipment configures or reconfigures the access relay node according to the predefined rule and the relay-related information of the user equipment, the method further includes:

the network control node sending relay judgment information of access relay node to the user equipment through broadcasting or dedicated signaling to determine the predefined rule, herein the relay judgment information includes: information about a remaining power level requirement of relay node, and/or a geographical location requirement of relay node, and/or a cellular link quality requirement of relay node, and/or a mobility state requirement of relay node, and/or a processing capability requirement, and/or a cellular and device-to-device communication service traffic requirement and/or a load requirement of relay node.

Alternatively, when the relay judgment information includes a geographical location requirement of relay node, the geographical location requirement of relay node is determined according to whether a signal measurement value of measurement performed by the user equipment to the relay-related information of the access relay node satisfies a given threshold.

Alternatively, when the relay judgment information includes a cellular link quality requirement of relay node, the cellular link quality requirement of relay node is determined according to whether a signal measurement value of measurement performed by the relay node to a serving cell satisfies a given threshold.

In another aspect, the present disclosure further provides user equipment for realizing device-to-device communication relay selection, including: a first sending unit and a first receiving unit, herein, the first sending unit is configured to send relay-related information used for determining a relay node to a network control node; and the first receiving unit is configured to, when the user equipment is determined as a relay node, receive device-to-device communication relay configuration information sent by the network control node.

Alternatively, the user equipment further includes a second receiving unit configured to receive request information, sent by the network control node, of the relay-related information or report configuration information of the relay-related information, herein, when the request information of the relay-related information or the report configuration information of the relay-related information is received, the first sending unit sends the relay-related information.

Alternatively, the user equipment further includes a resource pool monitoring unit configured to receive a relay reception resource pool and/or relay threshold sent or pre-configured by the network control node through broadcasting, monitor the relay reception resource pool and receive relay information sent by adjacent relay nodes or relay node seeking information sent by adjacent user equipment.

Alternatively, the user equipment further includes a relay processing unit configured to execute activation and/or setup, release and/or deactivation or modification of a relay function of the determined relay node according to the device-to-device communication relay configuration information.

In another aspect, the present disclosure further provides a network control node for realizing device-to-device communication relay selection, including: a relay determination unit and a third sending unit, herein, the relay determination unit is configured to receive relay-related information sent by user equipment and determine a relay node; and the third sending unit is configured to send device-to-device communication relay configuration information to the determined relay node.

Alternatively, the relay determination unit is configured to receive the relay-related information sent by the user equipment, perform relay node selection or configuration according to the relay-related information and determine user equipment selected or configured as a relay node as a relay node.

Alternatively, the network control node further includes a fourth sending unit configured to, before the network control node receives the relay-related information sent by the user equipment, send request information or report configuration information of the relay-related information to the user equipment.

Alternatively, the network control node further includes a resource pool unit configured to, before the relay determination unit receives the relay-related information sent by the user equipment, send or preconfigure a relay reception resource pool and/or a relay threshold to the user equipment through broadcasting, such that the user equipment monitors the relay reception resource pool and receives relay advertisement information sent by other relay nodes or information sent by other user equipment about finding user equipment determined as a relay node.

Alternatively, the network control node further includes a selection and release unit configured to, after the relay determination unit receives the relay-related information sent by the user equipment, randomly select or release a relay node from user equipment supporting device-to-device communication relay; or judge whether the user equipment needs to be selected or configured as a relay node according to a predefined rule;

perform relay node configuration or reconfiguration to the user equipment selected as a relay node; and when the relay node is reselected, release one or more relay nodes which do not satisfy a relay node selection requirement, herein the predefined rule includes that:

when user equipment supports a device-to-device communication relay function and has a relay intention/interest/indication, and/or a cellular link quality is good, and/or a remaining power level is high, and/or a mobility state is low, and/or a geographical location is located at an edge of a non-covered area, and/or a geographical location is located at an edge of a cell, and/or a processing capability is strong, and/or a charging requirement is low and/or a cellular and device-to-device communication service traffic is low, the user equipment is selected as a relay node; and when user equipment selected as a relay node does not have a relay intention/interest/indication any longer, and/or a remaining power level is low, and/or a cellular link quality is poor, and/or a mobility state is high, and/or a geographical location is not located at an edge of a non-covered area any longer, and/or a geographical location is located at a non-edge of a cell, and/or a processing capability is weak, and/or a charging requirement is high and/or a cellular and device-to-device communication service traffic is high, the relay node is released.

In another aspect, the present disclosure further provides user equipment for realizing device-to-device communication relay selection, including: a fifth receiving unit and a determination unit, herein, the fifth receiving unit is configured to receive relay-related information; and the determination unit is configured to select or configure the user equipment as a relay node.

Alternatively, the user equipment further includes a resource pool monitoring unit configured to receive a relay reception resource pool and/or a relay threshold sent or preconfigured by a network control node through broadcasting, monitor the relay reception resource pool and receive relay information sent by adjacent relay nodes or relay node seeking information sent by adjacent user equipment; and the determination unit is configured to, when the monitoring unit does not receive the relay-related information sent by the adjacent user equipment or a received relay type sent by the adjacent user equipment is not a relay type supported by the user equipment, select or configure the user equipment as a relay node.

Alternatively, the resource pool monitoring unit is further configured to monitor the relay reception resource pool and judge whether there is information about the user equipment seeking the relay sent by adjacent user equipment; and the determination unit is configured to, when the monitoring unit receives the relay node seeking information sent by the adjacent user equipment, select or configure the user equipment as a relay node; or configure the user equipment as a relay node according to a predefined rule and the received relay-related information.

Alternatively, the user equipment further includes a relay processing unit configured to select or configure the user equipment as a relay node, and select or release a relay function of the user equipment according to a predefined rule and the received relay-related information, herein the predefined rule includes that:

when the user equipment supports a device-to-device communication relay function and has a relay intention/interest/indication, and/or a remaining power level is high, and/or a mobility state is low, and/or a geographical location is located at an edge of a cell, and/or a processing capability is strong, and/or a charging requirement is low and/or a cellular and device-to-device communication service traffic is low, the user equipment configures a relay function of the user equipment; and when the user equipment does not have a relay intention/interest/indication any longer, and/or a remaining power level is low, and/or a mobility state is high, and/or a geographical location is located at a non-edge of a cell, and/or a processing capability is weak, and/or a charging requirement is high and/or a cellular and device-to-device communication service traffic is high, the user equipment selects to release a relay function of the user equipment.

Alternatively, the user equipment further includes a relay judgment receiving unit configured to, before the user equipment selects or releases the relay function of the user equipment, receive relay judgment information sent by the network control node through broadcasting or dedicated signaling and send the relay judgment information as the predefined rule to the relay processing unit, herein the relay judgment information includes: an power level threshold requirement, and/or a mobility state requirement, and/or a geographical location requirement, and/or a processing capability requirement and/or a cellular and device-to-device communication service traffic requirement for use as a relay node, herein the geographical location requirement is determined according to whether a measurement value of measurement performed by the user equipment to RSRP of a serving cell and/or adjacent cell satisfies a given threshold.

In another aspect, the present disclosure further provides user equipment for realizing device-to-device communication relay selection, including: a sixth sending unit and a sixth receiving unit, herein, the sixth sending unit is configured to send an access relay request containing relay-related information to a network control node; and the sixth receiving unit is configured to receive an access relay configuration sent by the network control node.

Alternatively, the user equipment further includes a monitoring and acquisition unit configured to acquire relay-related information sent by a relay node by monitoring a relay reception resource pool; and when the user equipment is not capable of acquiring the relay-related information sent by the relay node by monitoring the relay reception resource pool, send a relay discovery message, such that an adjacent relay node sends the relay-related information to the user equipment after the adjacent relay node monitors the relay discovery message.

Alternatively, the user equipment further includes an access relay processing unit configured to execute configured activation and/or setup, release and/or deactivation or modification of an access relay node according to an access relay node configuration.

In another aspect, the present disclosure further provides a network control node for realizing device-to-device communication relay selection, including: a seventh receiving unit and a seventh sending unit, herein, the seventh receiving unit is configured to receive an access relay request containing relay-related information sent by user equipment; and the seventh sending unit is configured to send an access relay configuration to the user equipment.

Alternatively, the network control node further includes a resource pool broadcasting unit configured to send or preconfigure a relay reception resource pool and/or a relay selection threshold to the user equipment through broadcasting or dedicated signaling, such that the user equipment monitors the relay reception resource pool and acquires relay-related information sent by a relay node, herein the relay configuration request includes relay-related information, sent by a monitored relay node, of the relay node.

Alternatively, the network control node further includes an acquisition unit configured to judge a relay node adjacent to the user equipment according to a geographical location of the user equipment and acquire relay-related information corresponding to the adjacent relay node, so as to acquire the relay-related information of the adjacent relay node.

Alternatively, the network control node further includes a relay determination unit configured to select or configure user equipment as an access relay node according to the relay-related information.

Alternatively, the relay determination unit is further configured to, when the access relay request received by the sixth receiving unit and sent by the user equipment is a relay release request, release the access relay configuration of the user equipment; and when the access relay request received by the sixth receiving unit and sent by the user equipment is a relay update request, judge a relay type requested by the user equipment, find out a set of relay nodes corresponding to the relay type and adjacent to the user equipment, and randomly select an access relay node for the user equipment; or configure or reconfigure one or more access relay nodes for the user equipment according to a predefined rule and relay-related information of the relay node.

In another aspect, the present disclosure further provides user equipment for realizing device-to-device communication relay selection, including: an eighth receiving unit and a determination unit, herein, the eighth receiving unit is configured to receive relay-related information sent by an adjacent relay node; and the determination unit is configured to select or configure an access relay node.

Alternatively, the user equipment further includes a ninth receiving unit and a monitoring unit, herein, the ninth receiving unit is configured to, before the eighth receiving unit receives the relay-related information, receive a relay reception resource pool and/or a relay selection threshold sent or preconfigured by a network control node through broadcasting or dedicated signaling; and the monitoring unit is configured to monitor the relay reception resource pool and receive the relay-related information sent by a relay node.

Alternatively, the user equipment further includes a relay discovery unit configured to, when the sixth receiving unit is not capable of receiving the relay-related information sent by the relay node by monitoring the relay reception resource pool, send a relay discovery message through broadcasting, such that the user equipment monitors the relay-related information sent by the relay node.

Alternatively, the determination unit is configured to select or configure an access relay node according to the relay-related information.

Alternatively, the determination unit is configured to configure/reconfigure one or more relay access nodes according to a predefined rule and acquired relay-related information.

In another aspect, an embodiment of the present disclosure further provides a computer storage medium, storing computer-executable instructions used for executing the methods.

An embodiment of the present disclosure includes that: a network control node receives relay-related information sent by user equipment and determines a relay node; and the network control node sends device-to-device communication relay configuration information to the determined relay node. According to the embodiment of the present disclosure, by sending the relay-related information in a network to perform selection or configuration of a relay node, a corresponding solution is provided for a scenario for which relay selection is not provided, and thereby the selection of the relay node is realized.

After reading and understanding the drawings and the detailed description, other aspects may be understood.

DETAILED DESCRIPTION

An embodiment of the present disclosure will be described below in detail with reference to the drawings. It needs to be stated that embodiments in the present disclosure and the features in an embodiment may be mutually and freely combined under a situation of no conflict.

Figure 1:
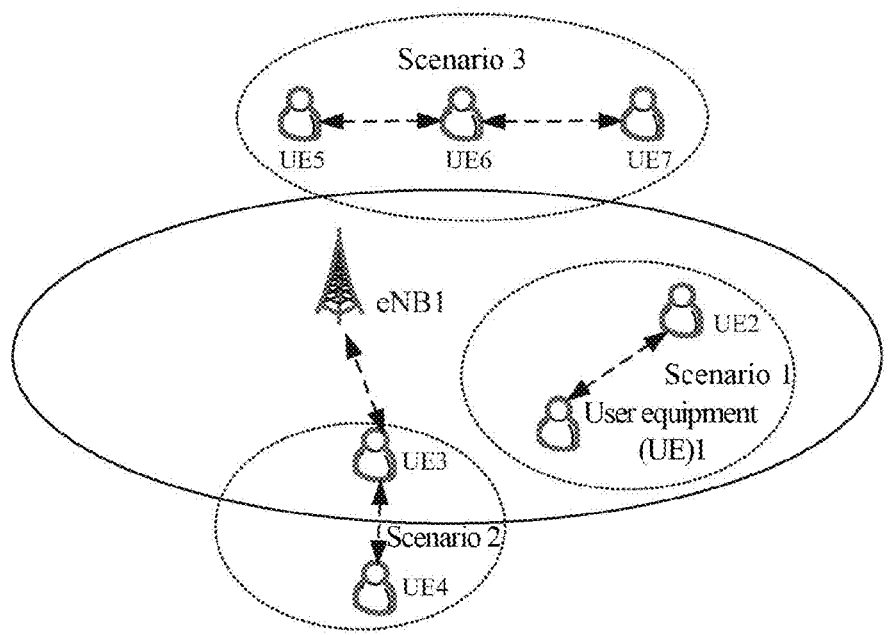
FIG. 1 illustrates a schematic diagram of related D2D application scenarios.
Figure 2:
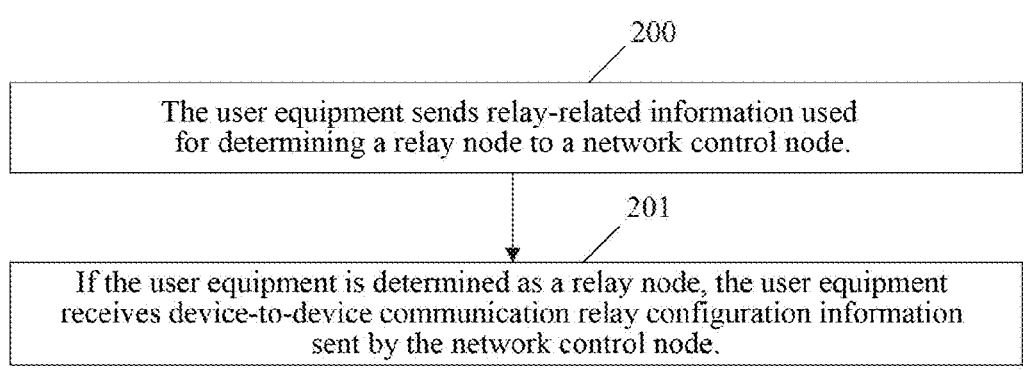
FIG. 2 illustrates a flowchart of a method for realizing device-to-device communication relay selection according to an embodiment of the present disclosure.

FIG. 2 illustrates a flowchart of a method for realizing device-to-device communication relay selection according to an embodiment of the present disclosure. As illustrated in FIG. 2, the method includes the following steps:

In step 200, the user equipment sends relay-related information used for determining a relay node to a network control node.

In this step, the relay-related information includes:

an indication that the user equipment supports device-to-device communication relay; and/or a remaining power level of the user equipment; and/or a geographical location of the user equipment; and/or a device-to-device communication group to which the user equipment belongs; and/or a relay intention/interest/indication of the user equipment; and/or a relay usable time period of the user equipment; and/or a relay type interested and/or supported by the user equipment; and/or a measurement result of measurement performed by the user equipment to a serving cell and/or an adjacent cell; and/or relay seeking information sent by user equipment seeking the relay node monitored by the user equipment; and/or relay information sent by the relay node monitored by the user equipment; and/or a mobility state indication of the user equipment; and/or a relay transmitting-receiving capability of the user equipment; and/or a processing capability of the user equipment; and/or a relay charging demand of the user equipment; and/or a cellular service traffic of the user equipment; and/or a device-to-device communication service traffic of the user equipment; and/or a relay load state of the user equipment.

In an embodiment of the present disclosure, the network control node includes: a base station and/or a network element having a ProSe function and/or other network elements executing a device-to-device communication relay selection function.

When the relay-related information includes the relay usable time period of the user equipment, the relay usable time period of the user equipment includes: a time period at which the user equipment is usable for device-to-device communication relay;

when the relay-related information includes the relay type interested and/or supported by the user equipment, the relay type includes: UE-to-UE relay and/or UE-to-network relay;

when the relay-related information includes the measurement result of measurement performed by the user equipment to the serving cell and/or the adjacent cell, the measurement result includes: measurement values of measurement performed by the user equipment to Reference Signal Received Power (RSRP), and/or Reference Signal Received Quality (RSRQ), and/or Channel State Information-Reference Signal Received Power (CSI-RSRP) and/or Channel State Information-Reference Signal Received Quality (CSI-RSRQ) of the serving cell and/or the adjacent cell;

when the relay-related information includes the relay information sent by the relay node monitored by the user equipment, the relay information sent by the relay node monitored by the user equipment includes whether the user equipment monitors relay information sent by adjacent device-to-device communication relay user equipment;

when the user equipment monitors the relay information sent by the adjacent device-to-device communication relay user equipment, the relay information monitored by the user equipment further includes a monitored relay type of the adjacent device-to-device communication relay user equipment and/or a measurement result of measurement performed to the relay information of the adjacent device-to-device communication relay user equipment;

when the relay-related information includes the mobility state indication of the user equipment, the mobility state indication includes a moving speed indication;

when the relay-related information includes the relay transmitting-receiving capability of the user equipment, the relay transmitting-receiving capability of the user equipment includes: whether the user equipment has a dedicated transceiver hardware for relay transmitting-receiving and/or whether the user equipment supports a parallel device-to-device communication and cellular data transmitting/receiving;

when the relay-related information includes the processing capability of the user equipment, the processing capability of the user equipment includes: a hardware configuration capability or capability level of the user equipment, a difference reflecting a number of Central Processing Units CPU and/or a main frequency and/or an internal memory of the user equipment or data packet processing efficiency;

when the relay-related information includes the relay charging demand of the user equipment, the relay charging demand of the user equipment includes: price compensation per data unit or time unit expected by the user equipment for relay data forwarding;

when the relay-related information includes the cellular service traffic of the user equipment, the cellular service traffic of the user equipment includes: a current uplink and/or downlink cellular traffic of the user equipment;

when the relay-related information includes the device-to-device communication service traffic of the user equipment, the device-to-device communication service traffic of the user equipment includes: a current device-to-device communication discovery and/or communication data traffic of the user equipment;

when the relay-related information includes the relay load state of the user equipment, the relay load state of the user equipment includes: a relay forwarding data traffic of the user equipment and/or a relay forwarding load indication of the user equipment; and when the relay-related information includes the relay information sent by the relay node monitored by the user equipment, the relay information sent by the relay node monitored by the user equipment includes:

an indication that the user equipment supports device-to-device communication relay; and/or a remaining power level of the relay node; and/or a device-to-device communication group to which the relay node belongs; and/or a relay usable time period of the relay node; and/or a relay type of the relay node; and/or a mobility state indication of the relay node; and/or a relay transmitting-receiving capability of the relay node; and/or a processing capability of the relay node; and/or a relay charging demand of the relay node; and/or a cellular service traffic of the relay node; and/or a device-to-device communication service traffic of the relay node; and/or a relay load state of the relay node; and/or a serving cell identification of the relay node.

When the relay-related information includes the relay seeking information sent by user equipment seeking the relay node monitored by the user equipment, the relay seeking information sent by user equipment seeking the relay node monitored by the user equipment includes:

the number of the monitored user equipments seeking the relay node; and/or a user equipment identification of each monitored user equipment seeking the relay node; and/or a user equipment type; and/or a relay type sought by user equipment; and/or a communication target identification of user equipment; and/or whether the user equipment is capable of discovering a node corresponding to the communication target identification of the user equipment seeking the relay node; and/or a user equipment application type; and/or a user equipment priority, and/or communication target priority and/or application priority; and/or a measurement result of measurement performed by the user equipment to the user equipment seeking the relay node; and/or user equipment traffic and service quality demands; and/or a user equipment coverage state; and/or a user equipment serving cell identification.

Alternatively, when the relay-related information includes the type of the user equipment seeking the relay node, the type of the user equipment seeking the relay node includes public security D2D user equipment and non-public security D2D user equipment;

when the relay-related information includes the communication target identification of the user equipment seeking the relay node, a communication target of the user equipment seeking the relay node includes: target user equipment and/or a target device-to-device communication group;

when the relay-related information includes the measurement result performed by the user equipment to the user equipment seeking the relay node, the measurement result performed by the user equipment to the user equipment seeking the relay node includes: signal intensity measurement performed by the user equipment to the relay seeking information sent by the user equipment seeking the relay node or measurement performed to a corresponding reference signal; and when the relay-related information includes the coverage state of the user equipment seeking the relay node, the coverage state of the user equipment seeking the relay node includes a covered state and a non-covered state.

When the relay-related information includes the traffic and service quality demands of the user equipment seeking the relay node, the relay-related information further includes:

a guaranteed bitrate, and/or guaranteed maximum bitrate, and/or guaranteed average bitrate, and/or overall traffic, and/or service quality type indication and/or priority corresponding to a service flow which needs to be relay-forwarded by the user equipment seeking the relay node.

Before this step, the method further includes the following step,

The user equipment receives request information, sent by the network control node, of the relay-related information or report configuration information of the relay-related information, and the user equipment sends the relay-related information according to the request information of the relay-related information or the report configuration information of the relay-related information.

In step 201, if the user equipment is determined as a relay node, the user equipment receives device-to-device communication relay configuration information sent by the network control node.

In this step, the device-to-device communication relay configuration information includes:

configuration information about activation and/or setup, release and/or deactivation or modification of the relay node; and/or a relay identification, and/or relay type and/or relay time length/relay time period of the relay node, and/or relay node device-to-device communication transmission and reception resource configuration.

Before the user equipment sends the relay-related information to the network control node, the method provided by an embodiment of the present disclosure further includes the following steps:

the user equipment receives a relay reception resource pool and/or relay threshold information sent or preconfigured by the network control node through broadcasting; and the user equipment monitors the relay reception resource pool and receives relay information sent by adjacent relay nodes or relay node seeking information sent by adjacent user equipment; or the user equipment judges whether a relay threshold is satisfied according to the measurement result, and if the threshold is satisfied, it receives relay information sent by adjacent relay nodes or adjacent user equipment which satisfy the relay threshold or sends the relay-related information to the network control node, herein the relay threshold information includes: a link quality measurement minimum threshold of serving cell, and/or a remaining power level threshold and/or a mobility state threshold.

After the user equipment determined as a relay node receives the device-to-device communication relay configuration information sent by the network control node, the method provided by an embodiment of the present disclosure further includes the following steps.

The user equipment executes activation and/or setup, release and/or deactivation or modification of a relay function of the determined relay node according to the device-to-device communication relay configuration information.

Figure 3:
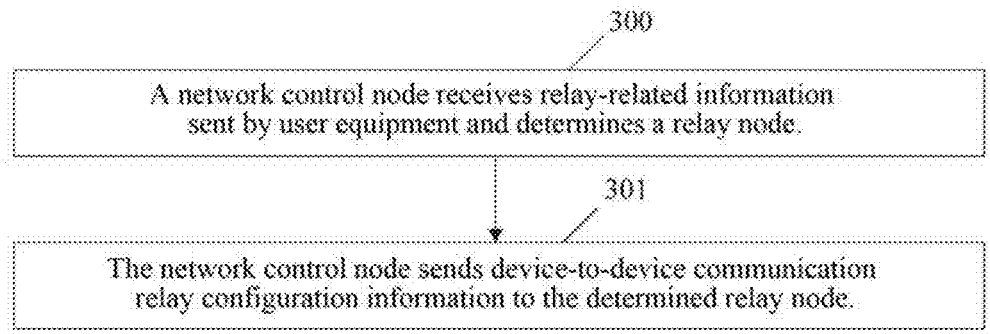
FIG. 3 illustrates a flowchart of another method for realizing device-to-device communication relay selection according to an embodiment of the present disclosure.

FIG. 3 illustrates a flowchart of another method for realizing device-to-device communication relay selection according to an embodiment of the present disclosure. As illustrated in FIG. 3, the method includes the following steps.

In step 300, a network control node receives relay-related information sent by user equipment and determines a relay node.

In this step, the operation of determining a relay node includes the following operation.

The network control node performs the relay node selection or configuration according to the relay-related information and determines user equipment which is selected or configured as a relay node as the relay node.

In this step, the relay-related information includes:

a remaining power level of the user equipment; and/or a geographical location of the user equipment; and/or a device-to-device communication group to which the user equipment belongs; and/or a relay intention/interest/indication of the user equipment; and/or a relay usable time period of the user equipment; and/or a relay type interested and/or supported by the user equipment; and/or a measurement result of measurement performed by the user equipment to a serving cell and/or an adjacent cell; and/or relay seeking information sent by user equipment seeking the relay node monitored by the user equipment; and/or relay information sent by the relay node monitored by the user equipment; and/or a mobility state indication of the user equipment; and/or a relay transmitting-receiving capability of the user equipment; and/or a processing capability of the user equipment; and/or a relay charging demand of the user equipment; and/or a cellular service traffic of the user equipment; and/or a device-to-device communication service traffic of the user equipment; and/or a relay load state of the user equipment.

Alternatively, when the relay-related information includes the relay usable time period of the user equipment, the relay usable time period of the user equipment includes: a time period at which the user equipment is usable for device-to-device communication relay;

when the relay-related information includes the relay type interested and/or supported by the user equipment, the relay type includes: UE-to-UE relay and/or UE-to-network relay;

when the relay-related information includes the measurement result of measurement performed by the user equipment to the serving cell and/or the adjacent cell, the measurement result includes: measurement values of measurement performed by the user equipment to RSRP, and/or RSRQ, and/or CSI-RSRP and/or CSI-RSRQ of the serving cell and/or the adjacent cell;

when the relay-related information includes the relay information sent by the relay node monitored by the user equipment, the relay information sent by the relay node monitored by the user equipment includes whether the user equipment monitors relay information sent by adjacent device-to-device communication relay user equipment;

when the user equipment monitors the relay information sent by the adjacent device-to-device communication relay user equipment, the relay information monitored by the user equipment further includes a monitored relay type of the adjacent device-to-device communication relay user equipment and/or a measurement result of measurement performed to the relay information of the adjacent device-to-device communication relay user equipment;

when the relay-related information includes the mobility state indication of the user equipment, the mobility state indication includes a moving speed indication.

It needs to be stated that the moving speed indication generally includes high, medium, low and other graded moving speed indications set according to experience of one skilled in the art, and specific grades may be set according to the actual situations.

When the relay-related information includes the relay transmitting-receiving capability of the user equipment, the relay transmitting-receiving capability of the user equipment includes: whether the user equipment has a dedicated transceiver hardware for relay transmitting-receiving and/or whether the user equipment supports parallel device-to-device communication and cellular data transmitting-receiving;

when the relay-related information includes the processing capability of the user equipment, the processing capability of the user equipment includes: a hardware configuration capability or capability level of the user equipment, a difference reflecting the number of CPU and/or a main frequency and/or an internal memory of the user equipment or data packet processing efficiency;

when the relay-related information includes the relay charging demand of the user equipment, the relay charging demand of the user equipment includes: price compensation per data unit/time unit expected by the user equipment for relay data forwarding;

when the relay-related information includes the cellular service traffic of the user equipment, the cellular service traffic of the user equipment includes: a current uplink and/or downlink cellular traffic of the user equipment;

when the relay-related information includes the device-to-device communication service traffic of the user equipment, the device-to-device communication service traffic of the user equipment includes: a current device-to-device communication discovery and/or communication data traffic of the user equipment;

when the relay-related information includes the relay load state of the user equipment, the relay load state of the user equipment includes: a relay forwarding data traffic of the user equipment and/or a relay forwarding load indication of the user equipment.

It needs to be stated that the relay forwarding load indication of the user equipment here refers to high, medium, low and other load indications determined according to experience of one skilled in the art and defined according to load standards.

When the relay-related information includes the relay information sent by the relay node monitored by the user equipment, the relay information sent by the relay node monitored by the user equipment includes:

an identification of the relay node; and/or
a remaining power level of the relay node; and/or
a device-to-device communication group to which the relay node belongs; and/or
a relay usable time period of the relay node; and/or
a relay type of the relay node; and/or
a mobility state indication of the relay node; and/or
a relay transmitting-receiving capability of the relay node; and/or
a processing capability of the relay node; and/or
a relay charging demand of the relay node; and/or
a cellular service traffic of the relay node; and/or
a device-to-device communication service traffic of the relay node; and/or
a relay load state of the relay node; and/or
a serving cell identification of the relay node.

When the relay-related information includes the relay seeking information sent by user equipment seeking the relay node monitored by the user equipment, the relay seeking information sent by user equipment seeking the relay node monitored by the user equipment includes:

a number of the monitored user equipment seeking the relay node; and/or
a user equipment identification
of each monitored user equipment seeking the relay node; and/or
a user equipment type; and/or
a relay type sought by user equipment; and/or
a communication target identification of user equipment; and/or whether the user equipment is capable of discovering a node corresponding to the communication target identification of the user equipment seeking the relay node; and/or
a user equipment application type; and/or
a user equipment priority, and/or communication target priority and/or application priority; and/or
a measurement result of measurement performed by the user equipment to the user equipment seeking the relay node; and/or
user equipment traffic and service quality demands; and/or
a user equipment coverage state; and/or
a user equipment serving cell identification.

When the relay-related information includes the type of the user equipment seeking the relay node, the type of the user equipment seeking the relay node includes: public security D2D user equipment and non-public security D2D user equipment;

when the relay-related information includes the communication target identification of the user equipment seeking the relay node, a communication target of the user equipment seeking the relay node includes: target user equipment and/or a target device-to-device communication group;

when the relay-related information includes the measurement result of measurement performed by the user equipment to the user equipment seeking the relay node, the measurement result of measurement performed by the user equipment to the user equipment seeking the relay node includes: signal intensity measurement performed by the user equipment to the relay seeking information sent by the user equipment seeking the relay node or measurement performed to a corresponding reference signal; and when the relay-related information includes the coverage state of the user equipment seeking the relay node, the coverage state of the user equipment seeking the relay node includes a covered state and a non-covered state.

When the relay-related information includes the traffic and service quality demands of the user equipment seeking the relay node, the relay-related information further includes:

a guaranteed bitrate, and/or guaranteed maximum bitrate, and/or guaranteed average bitrate, and/or overall traffic, and/or service quality type indication and/or priority corresponding to a service flow which needs to be relay-forwarded by the user equipment seeking the relay node.

Before the network control node receives the relay-related information sent by the user equipment, the method provided by an embodiment of the present disclosure further includes the following step:

the network control node sends request information of the relay-related information or report configuration information of the relay-related information to the user equipment.

The report configuration information of the relay-related information includes that: the report of the relay-related information is event report or periodic report and one or more relay-related information needs to be reported.

In step 301, the network control node sends device-to-device communication relay configuration information to the user equipment determined as the relay node.

In this step, the device-to-device communication relay configuration information includes:

configuration of activation and/or setup, release and/or deactivation or modification of the user equipment, which is selected as the relay node, used as the relay node; and/or a relay identification, and/or relay type and/or relay time length/relay time period of the user equipment which is selected as the relay node, and/or relay node device-to-device communication transmission and reception resource configuration.

After the network control nodes sends the device-to-device communication relay configuration information to the user equipment selected as the relay node, the method provided by an embodiment of the present disclosure further includes the following steps:

the user equipment receives the device-to-device communication relay configuration information sent by the network control node; and the user equipment executes setup, release or modification of a relay function of the relay node according to the device-to-device communication relay configuration information.

In an embodiment of the present disclosure, the network control node includes: a base station and/or a network element having a ProSe function and/or other network elements executing a device-to-device communication relay selection function.

Before the network control node receives the relay-related information sent by the user equipment, the method provided by an embodiment of the present disclosure further includes the following steps.

The user equipment receives a relay reception resource pool sent or preconfigured by the network control node through broadcasting; and the user equipment monitors the relay reception resource pool and receives relay information sent by adjacent relay nodes or relay node seeking information sent by adjacent user equipment.

Before the network control node receives the relay-related information sent by the user equipment, the method provided by an embodiment of the present disclosure further includes the following step:

the network control node sends a relay reception resource pool and/or relay threshold information, herein the relay threshold information includes: a link quality measurement minimum threshold of serving cell, and/or a remaining power level threshold and/or a mobility state threshold.

After the network control node receives the relay-related information sent by the user equipment, the method provided by an embodiment of the present disclosure further includes the following steps.

The network control node randomly selects or releases a relay node from user equipment supporting device-to-device communication relay; or the network control node judges whether user equipment needs to be selected or configured as a relay node according to a predefined rule;

the relay node configuration or reconfiguration is performed to the user equipment selected as the relay node; and when a relay node is reselected, one or more relay nodes which do not satisfy a relay node selection requirement are released, herein the predefined rule includes that:

when user equipment supports a device-to-device communication relay function and has a relay intention/interest/indication, and/or a remaining power level is high, and/or a mobility state is low, and/or a cellular link quality is good, and/or a geographical location is located at an edge of a non-covered area, and/or a geographical location is located at an edge of a cell, and/or a processing capability is strong, and/or a charging requirement is low and/or a cellular and device-to-device communication service traffic is low, the user equipment is selected as a relay node; and when user equipment selected as a relay node does not have a relay intention/interest/indication any longer, and/or a remaining power level is low, and/or a mobility state is high, and/or a cellular link quality is poor, and/or a geographical location is not located at an edge of a non-covered area any longer, and/or a geographical location is located at a non-edge of a cell, and/or a processing capability is weak, and/or a charging requirement is high and/or a cellular and device-to-device communication service traffic is high, the relay node is released.

It needs to be stated that the change of relay-related information refers to change in the relay-related information, such as change in the relay load state, and/or the monitored information of the user equipment seeking the relay, the mobility state reported by the user equipment configured as the device-to-device communication relay node, and/or the remaining power level.

Figure 4:
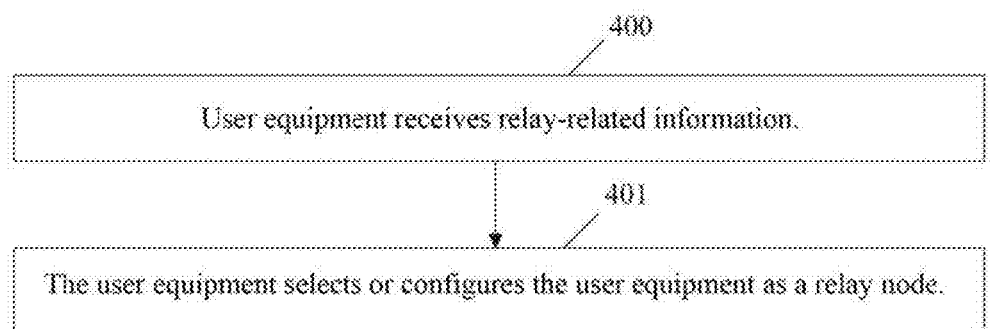
FIG. 4 illustrates a flowchart of another method for realizing device-to-device communication relay selection according to an embodiment of the present disclosure.

FIG. 4 illustrates a flowchart of another method for realizing device-to-device communication relay selection according to an embodiment of the present disclosure. As illustrated in FIG. 4, the method includes the following steps.

In step 400, user equipment receives relay-related information.

Before the user equipment receives relay-related information, the method provided by an embodiment of the present disclosure further includes the following steps.

The user equipment receives a relay reception resource pool and/or relay threshold information sent or preconfigured by a network control node through broadcasting; and the user equipment judges whether a relay threshold is satisfied according to a measurement result of measurement performed to a serving cell, and if the relay threshold is not satisfied, it selects to not receive the relay-related information any longer, herein the relay threshold information includes: a link quality measurement minimum threshold of serving cell, and/or a remaining power level threshold and/or a mobility state threshold.

In step 401, the user equipment selects or configures the user equipment as a relay node.

It needs to be stated that selecting or configuring as a relay node is actually determining as a relay node.

In this step, the operation of selecting or configuring the user equipment as a relay node includes the following operations.

The user equipment monitors the relay reception resource pool and judges whether there is relay-related information sent by adjacent relay nodes; and if there is the relay-related information, it receives the relay-related information sent by adjacent relay nodes; and when the user equipment does not receive relay-related information sent by adjacent user equipment; or the received relay type sent by the adjacent user equipment is not a relay type supported by the user equipment, the user equipment selects or configures the user equipment as a relay node.

When the user equipment receives the relay-related information, the method provided by an embodiment of the present disclosure further includes the following steps.

The user equipment monitors the relay reception resource pool and judges whether there is relay seeking information sent by adjacent user equipment; and if there is relay seeking information, it receives relay node seeking information sent by adjacent user equipment; and the user equipment selects or configures the user equipment as a relay node according to the monitored relay node seeking information sent by the adjacent user equipment.

If the user equipment selects or configures the user equipment as a relay node, the method provided by an embodiment of the present disclosure further includes the following steps.

The user equipment selects or releases a relay function of the user equipment according to a predefined rule and the received relay-related information, herein the predefined rule includes that:

when the user equipment supports a device-to-device communication relay function and has a relay intention/interest/indication, and/or a remaining power level is high, and/or a mobility state is low, and/or a cellular link quality is good, and/or a geographical location is located at an edge of a non-covered area, and/or a geographical location is located at an edge of a cell, and/or a processing capability is strong, and/or a charging requirement is low and/or a cellular and device-to-device communication service traffic is low, the user equipment configures a relay function of the user equipment and selects the user equipment as a relay node; and when the user equipment does not have a relay intention/interest/indication any longer, and/or a remaining power level is low, and/or a mobility state is high, and/or a cellular link quality is poor, and/or a geographical location is not located at an edge of a non-covered area any longer, and/or a geographical location is located at a non-edge of a cell, and/or a processing capability is weak, and/or a charging requirement is high and/or a cellular and device-to-device communication service traffic is high, the user equipment selects to release a relay function of the user equipment.

Before the user equipment configures or releases the relay function of the user equipment, the method provided by an embodiment of the present disclosure further includes the following steps.

A network control node sends the relay judgment information as the predefined rule to the user equipment through broadcasting or dedicated signaling, herein the relay judgment information includes: an power level threshold requirement, and/or a mobility state requirement, and/or a cellular link quality requirement, and/or a geographical location requirement, and/or a processing capability requirement and/or a cellular and device-to-device communication service traffic requirement for use as a relay node, herein the cellular link quality requirement is determined according to whether a measurement value of measurement performed by the user equipment to RSRP or RSRQ of a serving cell and/or an adjacent cell satisfies a given threshold; and the geographical location requirement is determined according to whether a measurement value of measurement performed by the user equipment to the RSRP of the serving cell and/or the adjacent cell satisfies a given threshold.

It needs to be stated that determining the geographical location requirement according to whether a measurement value of measurement performed by the user equipment to the RSRP of the serving cell and/or the adjacent cell satisfies a given threshold is one of determination methods, and other methods which can be used for determining the geographical location requirement may also be applied to an embodiment of the present disclosure.

After the user equipment selects or configures a relay node, the method provided by an embodiment of the present disclosure further includes the following step: a relay configuration performed by a network control node to the user equipment is capable of overlaying an autonomous relay configuration of the user equipment.

Figure 5:
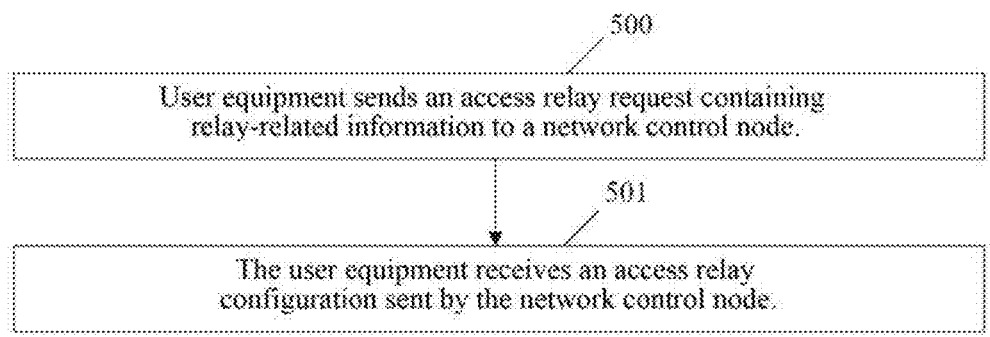
FIG. 5 illustrates a flowchart of another method for realizing device-to-device communication relay selection according to an embodiment of the present disclosure.

FIG. 5 illustrates a flowchart of another method for realizing device-to-device communication relay selection according to an embodiment of the present disclosure. As illustrated in FIG. 5, the method includes the following steps.

In step 500, the user equipment sends an access relay request containing relay-related information to a network control node.

In an embodiment of the present disclosure, the access relay includes: a device-to-device communication relay device having a relay function and capable of forwarding data for the user equipment.

The access relay request includes: an access relay node configuration request, and/or an access relay node release request and/or an access relay node update request.

The access relay request includes:

a requested relay type, the requested number of access relay nodes, a device-to-device communication group to which the user equipment belongs, a geographical location of the user equipment, and relay-related information, sent by a monitored relay node, of the relay node.

When the access relay request is an access relay node release request or an access relay node update request, the access relay request further includes configured access relay node identification information.

When the relay-related information is obtained by monitoring information sent by a relay node, the relay-related information sent by the relay node includes:

an identification of the relay node; and/or a remaining power level of the relay node; and/or a device-to-device communication group to which the relay node belongs; and/or a relay usable time period of the relay node; and/or a relay type supported by the relay node; and/or a measurement result of relay information received by the relay node from user equipment; and/or a mobility state indication of the relay node; and/or a relay transmitting-receiving capability of the relay node; and/or a processing capability of the relay node; and/or a relay charging demand of the relay node; and/or a coverage state of the relay node; and/or a serving cell identification of the relay node; and/or a minimum number of hops from the relay node to a network node; and/or a relay load state of the relay node; and/or an access forbidden state of the relay node; and/or Public Land Mobile Network PLMN information of the relay node; and/or a measurement result of relay information received by the relay node from the user equipment.

The operation of obtaining the relay-related information by monitoring information sent by the relay node includes the following operations.

The user equipment receives a relay reception resource pool sent or preconfigured by the network control node through broadcasting or dedicated signaling; and the user equipment monitors the relay reception resource pool and acquires the relay-related information sent by the relay node.

When the user equipment is not capable of acquiring the relay-related information sent by the relay node by monitoring the relay reception resource pool, the method provided by an embodiment of the present disclosure further includes the following steps.

the user equipment sends a relay discovery message through broadcasting; and after an adjacent relay node monitors the relay discovery message, the relay-related information is sent to the user equipment.

In step 501, the user equipment receives an access relay configuration sent by the network control node.

The access relay configuration includes: a relay identification of the access relay node, and configuration of activation and/or setup, release and/or deactivation or modification of the access relay node.

After the user equipment receives the access relay configuration sent by the network control node, the method further includes the following step.

The user equipment executes configured activation and/or setup, release and/or deactivation or modification of the access relay node according to the access relay configuration.

Figure 6:
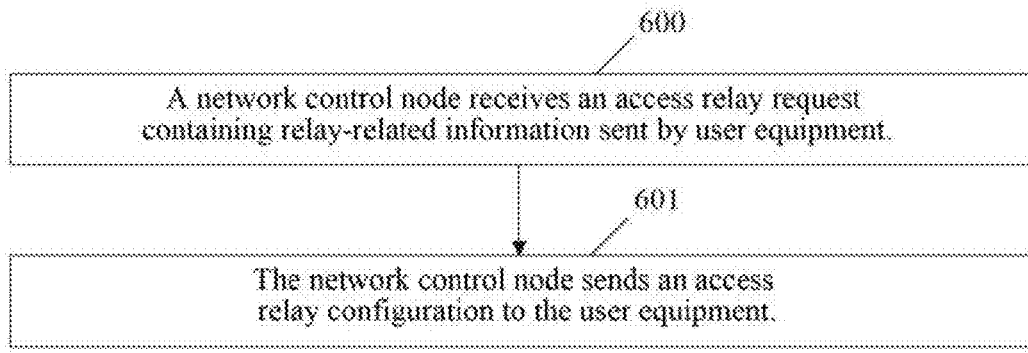
FIG. 6 illustrates a flowchart of another method for realizing device-to-device communication relay selection according to an embodiment of the present disclosure.

FIG. 6 illustrates a flowchart of another method for realizing device-to-device communication relay selection according to an embodiment of the present disclosure. As illustrated in FIG. 6, the method includes the following steps.

In step 600, a network control node receives an access relay request containing relay-related information sent by user equipment.

In this step, the access relay request includes:

an access relay node configuration request, and/or an access relay node release request and/or an access relay node update request.

The access relay request includes:

a requested relay type, and/or the requested number of access relay nodes, and/or a device-to-device communication group to which the user equipment belongs, and/or a geographical location of the user equipment, and/or relay-related information, sent by a monitored relay node, of the relay node.

When the access relay request is an access relay node release request or an access relay node update request, the access relay request further includes: configured access relay node identification information.

When the relay-related information is obtained by monitoring information sent by a relay node, the relay-related information includes:

an identification of the relay node; and/or a remaining power level of the relay node; and/or a device-to-device communication group to which the relay node belongs; and/or a relay usable time period of the relay node; and/or a relay type supported by the relay node; and/or a measurement result of relay information received by the relay node from user equipment; and/or a mobility state indication of the relay node; and/or a relay transmitting-receiving capability of the relay node; and/or a processing capability of the relay node; and/or a relay charging demand of the relay node; and/or a coverage state of the relay node; and/or a serving cell identification of the relay node; and/or a minimum number of hops from the relay node to a network node; and/or a relay load state of the relay node; and/or an access forbidden state of the relay node; and/or Public Land Mobile Network (PLMN) information of the relay node.

The operation of obtaining the relay-related information by monitoring information sent by the relay node includes the following operations.

The user equipment receives a relay reception resource pool sent or preconfigured by the network control node through broadcasting or dedicated signaling; and the user equipment monitors the relay reception resource pool and acquires the relay-related information sent by the relay node.

When the user equipment is not capable of acquiring the relay-related information sent by the relay node through broadcasting by monitoring the relay reception resource pool, the method further includes the following steps.

The user equipment sends a relay discovery message through broadcasting; and after an adjacent relay node monitors the relay discovery message, the relay-related information is sent to the user equipment.

In step 601, the network control node sends an access relay configuration to the user equipment.

In this step, the access relay includes: a device-to-device communication relay device having a relay function and capable of forwarding data for the user equipment.

The access relay configuration includes: a relay identification of the access relay node, configuration of activation and/or setup, release and/or deactivation or modification of the access relay node, and/or device-to-device communication transmission and reception resource configuration.

After the network control node sends the configuration of the access relay node to the user equipment, the method provided by an embodiment of the present disclosure further includes the following step.

The user equipment executes configured activation and/or setup, release and/or deactivation or modification of the access relay node according to the access relay node configuration.

Before this step, the method provided by an embodiment of the present disclosure further includes the following step:

the network control node judges a relay node adjacent to the user equipment according to the geographical location of the user equipment and acquires the relay-related information corresponding to the adjacent relay node.

The operation of acquiring the relay-related information corresponding to the adjacent relay node includes the following operation.

The network control node requests the relay node to send the relay-related information through broadcasting or send the relay-related information through dedicated signaling, such that the network control node acquires the relay-related information corresponding to the adjacent relay node.

Before the network control node sends the access relay node configuration to the user equipment, the method provided by an embodiment of the present disclosure further includes the following step.

The network control node selects or configures an access relay node for the user equipment according to the relay-related information.

The operation that the network control node selects or configures an access relay node for the user equipment according to the relay-related information includes the following operations.

When the access relay request received by the network control node and sent by the user equipment is a relay release request, the network control node releases the access relay configuration of the user equipment; and when the access relay request received by the network control node and sent by the user equipment is a relay update request, a relay type requested by the user equipment is judged, a set of relay nodes corresponding to the relay type and adjacent to the user equipment is found out, and an access relay node is randomly selected for the user equipment; or the network control node configures or reconfigures one or more access relay nodes for the user equipment according to a predefined rule and relay-related information of the relay node.

It needs to be stated that the predefined rule refers to a rule predefined according to experience of one skilled in the art, such as that the remaining power level is high, and/or the mobility state is low; and/or the geographical location is adjacent to the user equipment; and/or the processing capability is strong/the charging requirement is low, and/or the cellular and device-to-device communication service traffic is low, and/or the relay load is low, and/or the relay access forbidden state is a non-forbidden state, and/or the relay node has a PLMN/D2D group consistent with the user equipment.

Figure 7:
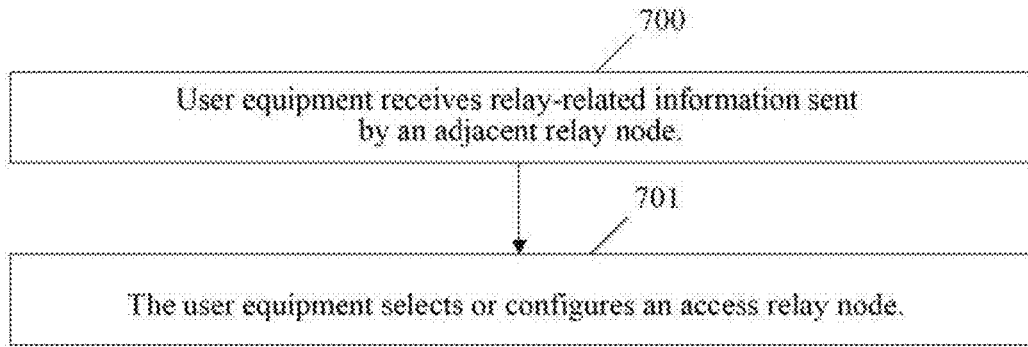
FIG. 7 illustrates a flowchart of another method for realizing device-to-device communication relay selection according to an embodiment of the present disclosure.

FIG. 7 illustrates a flowchart of another method for realizing device-to-device communication relay selection according to an embodiment of the present disclosure. As illustrated in FIG. 7, the method includes the following steps:

In step 700, the user equipment receives relay-related information sent by an adjacent relay node.

Before this step, the method further includes the following steps.

The user equipment receives a relay reception resource pool and/or a relay selection threshold sent or preconfigured by a network control node through broadcasting or dedicated signaling, herein the relay selection threshold includes: a relay selection minimum device-to-device communication link quality threshold, and/or a relay reselection device-to-device communication link threshold and/or a relay reselection hysteresis value; and when the user equipment has not selected an access node or the user equipment has already selected an access node but a measurement result of measurement performed by the user equipment to the relay-related information sent by the selected relay node is less than the relay reselection device-to-device communication link threshold, the user equipment monitors the relay reception resource pool and receives the relay-related information sent by the relay node, herein the relay-related information includes:
an identification of the relay node; and/or
a remaining power level of the relay node; and/or
a device-to-device communication group to which the relay node belongs; and/or
a relay usable time period of the relay node; and/or
a relay type supported by the relay node; and/or
a mobility state indication of the relay node; and/or
a relay transmitting-receiving capability of the relay node; and/or
a processing capability of the relay node; and/or
a relay charging demand of the relay node; and/or
a coverage state of the relay node; and/or
a serving cell identification of the relay node; and/or
a minimum number of hops from the relay node to a network node; and/or
a relay load state of the relay node; and/or
an access forbidden state of the relay node; and/or
Public Land Mobile Network PLMN information of the relay node.

When the user equipment is not capable of receiving the relay-related information sent by the relay node by monitoring the relay reception resource pool, the method provided by an embodiment of the present disclosure further includes the following steps.

the user equipment sends a relay discovery message through broadcasting; and after the relay node monitors the relay discovery message, the relay-related information is sent.

In step 701, the user equipment selects or configures an access relay node.

Before this step, the method provided by an embodiment of the present disclosure further includes the following step:

the user equipment selects or configures an access relay node according to the relay-related information.

The operation that the user equipment selects or configures an access relay node includes the following operation.

The user equipment configures/reconfigures one or more relay access nodes according to a predefined rule and acquired relay-related information.

Alternatively, when the user equipment has not selected an access relay node, the user equipment judges whether a measurement result of the relay-related information sent to the relay node is greater than a relay selection minimum device-to-device communication link quality threshold, and if the measurement result is less than the relay selection minimum device-to-device communication link quality threshold, the relay node is excluded; and when the user equipment has already selected an access relay node, the user equipment adds a relay reselection hysteresis value to the measurement value of the selected access relay node, then ranks the measurement value added with the relay reselection hysteresis value and measurement results of all other monitored relay nodes, and reselects a relay node ranked at the topmost place.

It needs to be stated that, if judgment is made according to a plurality of predefined rules, the judgment sequence may be set according to experience of one skilled in the art. For example, the user equipment having a device-to-device communication relay function and having a relay intention/interest/indication is set as a first judgment rule, the remaining power level being high or low is set as a second judgment rule, etc., and the specific rules may be added or adjusted according to the actual situations.

Before the user equipment configures or reconfigures the access relay node according to the predefined rule and the relay-related information of the user equipment, the method further includes the following step.

The network control node sends relay judgment information of access relay node to the user equipment through broadcasting or dedicated signaling to determine the predefined rule, herein the relay judgment information includes: information about a remaining power level requirement of relay node, and/or a geographical location requirement of relay node, and/or a cellular link quality requirement of relay node, and/or a mobility state requirement of relay node, and/or a processing capability requirement, and/or a cellular and device-to-device communication service traffic requirement and/or a load requirement of relay node.

When the relay judgment information includes a cellular link quality requirement of relay node, the cellular link quality requirement of relay node is determined according to whether a signal measurement value of measurement performed by the relay node to a serving cell satisfies a given threshold.

When the relay judgment information includes a geographical location requirement of relay node, the geographical location requirement of relay node is determined according to whether a signal measurement value of measurement performed by the user equipment to the relay-related information of the relay node satisfies a given threshold.

After the user equipment selects or configures an access relay node according to the relay-related information of the user equipment, the method provided by an embodiment of the present disclosure further includes the following step.

An access relay node configuration performed by the network control node to the user equipment is capable of overlaying an access relay node configuration of the user equipment.

An embodiment of the present disclosure further provides a computer storage medium, storing computer-executable instructions used for executing the methods.

Figure 8:
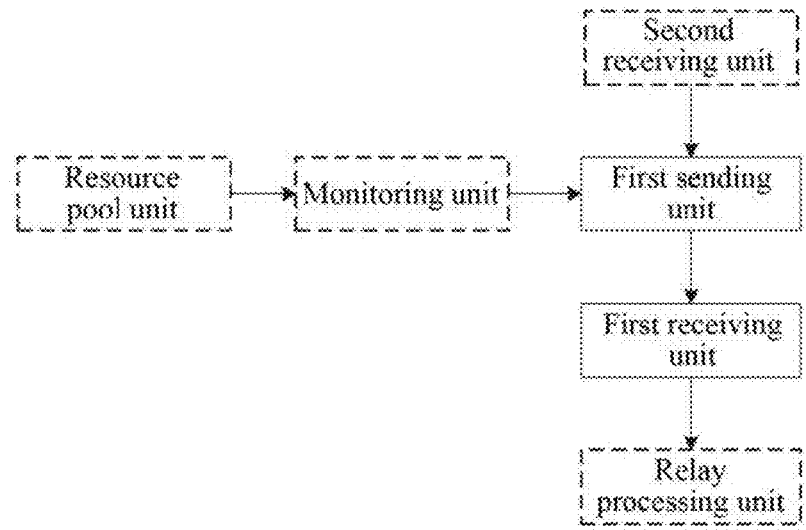
FIG. 8 illustrates a structural diagram of user equipment for realizing device-to-device communication relay selection according to an embodiment of the present disclosure.

FIG. 8 illustrates a structural diagram of network control node for realizing device-to-device communication relay selection according to an embodiment of the present disclosure. As illustrated in FIG. 8, it includes: a first sending unit and a first receiving unit, herein, the first sending unit is configured to send relay-related information used for determining a relay node to a network control node; and the first receiving unit is configured to, when the user equipment is determined as a relay node, receive device-to-device communication relay configuration information sent by the network control node.

The user equipment provided by an embodiment of the present disclosure further includes a second receiving unit configured to receive request information, sent by the network control node, of the relay-related information or report configuration information of the relay-related information, herein, when the request information of the relay-related information or the report configuration information of the relay-related information is received, the first sending unit sends the relay-related information.

The user equipment provided by an embodiment of the present disclosure further includes a resource pool monitoring unit configured to receive a relay reception resource pool sent or preconfigured by the network control node through broadcasting, monitor the relay reception resource pool and/or relay threshold and receive relay information sent by adjacent relay nodes or relay node seeking information sent by adjacent user equipment.

The user equipment provided by an embodiment of the present disclosure further includes a relay processing unit configured to execute activation and/or setup, release and/or deactivation or modification of a relay function of the determined relay node according to the device-to-device communication relay configuration information.

Figure 9:
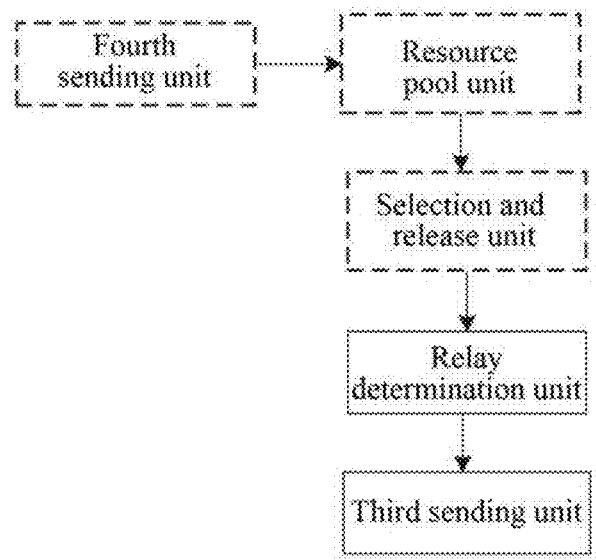
FIG. 9 illustrates a structural diagram of a network control node for realizing device-to-device communication relay selection according to an embodiment of the present disclosure.

FIG. 9 illustrates a structural diagram of a network control node for realizing device-to-device communication relay selection according to an embodiment of the present disclosure. As illustrated in FIG. 9, the network control node includes: a relay determination unit and a third sending unit, herein, the relay determination unit is configured to receive relay-related information sent by user equipment and determine a relay node; and the third sending unit is configured to send device-to-device communication relay configuration information to the determined relay node.

The relay determination unit is configured to receive the relay-related information sent by the user equipment, perform the relay node selection or configuration according to the relay-related information and determine the user equipment selected or configured as a relay node as a relay node.

The network control node provided by an embodiment of the present disclosure further includes a fourth sending unit configured to, before the network control node receives the relay-related information sent by the user equipment, send request information or report configuration information of the relay-related information to the user equipment.

The network control node provided by an embodiment of the present disclosure further includes a resource pool unit configured to, before the relay determination unit receives the relay-related information sent by the user equipment, send or preconfigure a relay reception resource pool and/or a relay threshold to the user equipment through broadcasting, such that the user equipment monitors the relay reception resource pool and receives relay advertisement information sent by other relay nodes or information sent by other user equipment about finding user equipment determined as a relay node.

The network control node provided by an embodiment of the present disclosure further includes a selection and release unit configured to, after the relay determination unit receives the relay-related information sent by the user equipment, randomly select or release a relay node from user equipment supporting device-to-device communication relay; or judge whether the user equipment needs to be selected or configured as a relay node according to a predefined rule;

perform the relay node configuration or reconfiguration to the user equipment selected as a relay node; and when the relay node is reselected, release one or more relay nodes which do not satisfy a relay node selection requirement, herein the predefined rule includes that:

when user equipment supports a device-to-device communication relay function and has a relay intention/interest/indication, and/or a remaining power level is high, and/or a mobility state is low, and/or a cellular link quality is good, and/or a geographical location is located at an edge of a non-covered area, and/or a geographical location is located at an edge of a cell, and/or a processing capability is strong, and/or a charging requirement is low and/or a cellular and device-to-device communication service traffic is low, the user equipment is selected as a relay node; and when user equipment selected as a relay node does not have a relay intention/interest/indication any longer, and/or a remaining power level is low, and/or a cellular link quality is poor, and/or a mobility state is high, and/or a geographical location is not located at an edge of a non-covered area any longer, and/or a geographical location is located at a non-edge of a cell, and/or a processing capability is weak, and/or a charging requirement is high and/or a cellular and device-to-device communication service traffic is high, the relay node is released.

Figure 10:
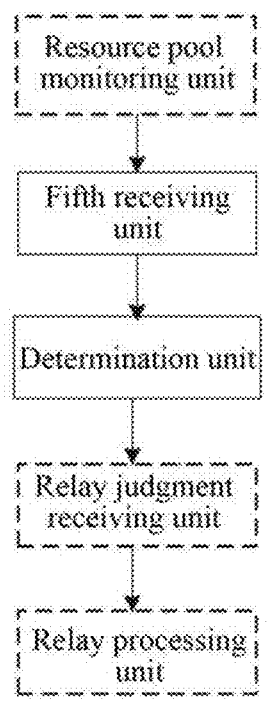
FIG. 10 illustrates a structural diagram of another piece of user equipment for realizing device-to-device communication relay selection according to an embodiment of the present disclosure.

FIG. 10 illustrates a structural diagram of another piece of user equipment for realizing device-to-device communication relay selection according to an embodiment of the present disclosure. As illustrated in FIG. 10, the user equipment includes: a fifth receiving unit and a determination unit, herein, the fifth receiving unit is configured to receive relay-related information; and the determination unit is configured to select or configure the user equipment as a relay node.

The user equipment further includes a resource pool monitoring unit configured to receive a relay reception resource pool and/or a relay threshold sent or preconfigured by a network control node through broadcasting, monitor the relay reception resource pool and receive relay information sent by adjacent relay nodes or the relay node seeking information sent by adjacent user equipment; and the determination unit is configured to, when the monitoring unit does not receive the relay-related information sent by the adjacent user equipment or a received relay type sent by the adjacent user equipment is not a relay type supported by the user equipment, select or configure the user equipment as a relay node.

The resource pool monitoring unit is further configured to monitor the relay reception resource pool and judge whether there is relay user equipment finding information sent by adjacent user equipment; and the determination unit is configured to, when the monitoring unit receives the relay node seeking information sent by the adjacent user equipment, select or configure the user equipment as a relay node; or configure the user equipment as a relay node according to a predefined rule and the received relay-related information.

The user equipment provided by an embodiment of the present disclosure further includes a relay processing unit configured to select or configure the user equipment as a relay node, and select or release a relay function of the user equipment according to a predefined rule and the received relay-related information, herein the predefined rule includes that:

when the user equipment supports a device-to-device communication relay function and has a relay intention/interest/indication, and/or a remaining power level is high, and/or a mobility state is low, and/or a cellular link quality is good, and/or a geographical location is located at an edge of a non-covered area, and/or a geographical location is located at an edge of a cell, and/or a processing capability is strong, and/or a charging requirement is low and/or a cellular and device-to-device communication service traffic is low, the user equipment configures a relay function of the user equipment; and when the user equipment does not have a relay intention/interest/indication any longer, and/or a remaining power level is low, and/or a mobility state is high, and/or a cellular link quality is poor, and/or a geographical location is not located at an edge of a non-covered area any longer, and/or a geographical location is located at a non-edge of a cell, and/or a processing capability is weak, and/or a charging requirement is high and/or a cellular and device-to-device communication service traffic is high, the user equipment selects to release a relay function of the user equipment.

The user equipment provided by an embodiment of the present disclosure further includes a relay judgment receiving unit configured to, before the user equipment selects or releases the relay function of the user equipment, receive relay judgment information sent by the network control node through broadcasting or dedicated signaling and send the relay judgment information as the predefined rule to the relay processing unit, herein the relay judgment information includes: an power level threshold requirement, and/or a mobility state requirement, and/or a geographical location requirement, and/or a processing capability requirement and/or a cellular and device-to-device communication service traffic requirement for use as a relay node, herein the geographical location requirement is determined according to whether a measurement value of measurement performed by the user equipment to RSRP of a serving cell and/or adjacent cell satisfies a given threshold.

Figure 11:
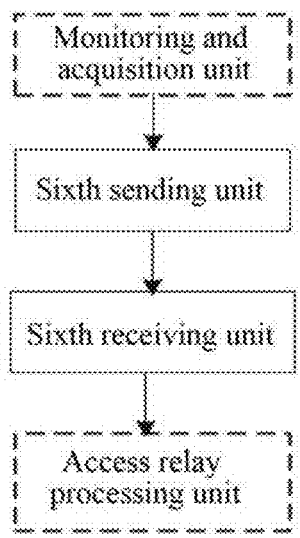
FIG. 11 illustrates a structural diagram of another piece of user equipment for realizing device-to-device communication relay selection according to an embodiment of the present disclosure.

FIG. 11 illustrates a structural diagram of another piece of user equipment for realizing device-to-device communication relay selection according to an embodiment of the present disclosure. As illustrated in FIG. 11, the user equipment includes:

a sixth sending unit and a sixth receiving unit, herein, the sixth sending unit is configured to send an access relay request containing relay-related information to a network control node; and the sixth receiving unit is configured to receive an access relay configuration sent by the network control node.

The user equipment provided by an embodiment of the present disclosure further includes a monitoring and acquisition unit configured to acquire relay-related information sent by a relay node by monitoring a relay reception resource pool; and when the user equipment is not capable of acquiring the relay-related information sent by the relay node by monitoring the relay reception resource pool, send a relay discovery message, such that an adjacent relay node sends the relay-related information to the user equipment after the adjacent relay node monitors the relay discovery message.

The user equipment provided by an embodiment of the present disclosure further includes an access relay processing unit configured to execute configured activation and/or setup, release and/or deactivation or modification of an access relay node according to an access relay node configuration.

Figure 12:
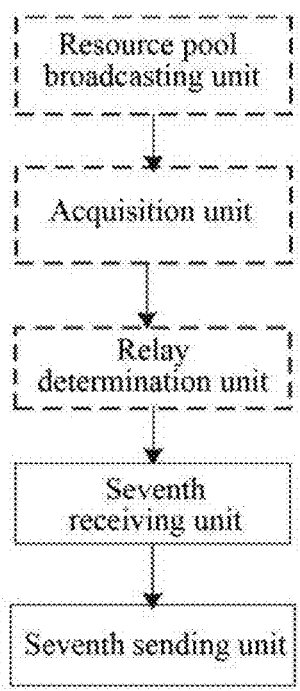
FIG. 12 illustrates a structural diagram of another network control node for realizing device-to-device communication relay selection according to an embodiment of the present disclosure.

FIG. 12 illustrates a structural diagram of another network control node for realizing device-to-device communication relay selection according to an embodiment of the present disclosure. As illustrated in FIG. 12, the network control node includes: a seventh receiving unit and a seventh sending unit, herein, the seventh receiving unit is configured to receive an access relay request containing relay-related information sent by user equipment; and the seventh sending unit is configured to send an access relay configuration to the user equipment.

The network control node provided by an embodiment of the present disclosure further includes a resource pool broadcasting unit configured to send or preconfigure a relay reception resource pool to the user equipment through broadcasting or dedicated signaling, such that the user equipment monitors the relay reception resource pool and/or acquires relay-related information sent by a relay node according to the relay selection threshold, herein the relay configuration request includes relay-related information, sent by a monitored relay node, of the relay node.

The network control node provided by an embodiment of the present disclosure further includes an acquisition unit configured to judge a relay node adjacent to the user equipment according to a geographical location of the user equipment and acquire relay-related information corresponding to the adjacent relay node, so as to acquire the relay-related information of the adjacent relay node.

The network control node provided by an embodiment of the present disclosure further includes a relay determination unit configured to select or configure user equipment as an access relay node according to the relay-related information. The relay determination unit is further configured to, when the access relay request received by the sixth receiving unit and sent by the user equipment is a relay release request, release the access relay configuration of the user equipment; and when the access relay request received by the sixth receiving unit and sent by the user equipment is a relay update request, judge a relay type requested by the user equipment, find out a set of relay nodes corresponding to the relay type and adjacent to the user equipment, and randomly select an access relay node for the user equipment; or configure or reconfigure one or more access relay nodes for the user equipment according to a predefined rule and relay-related information of the relay node.

Figure 13:
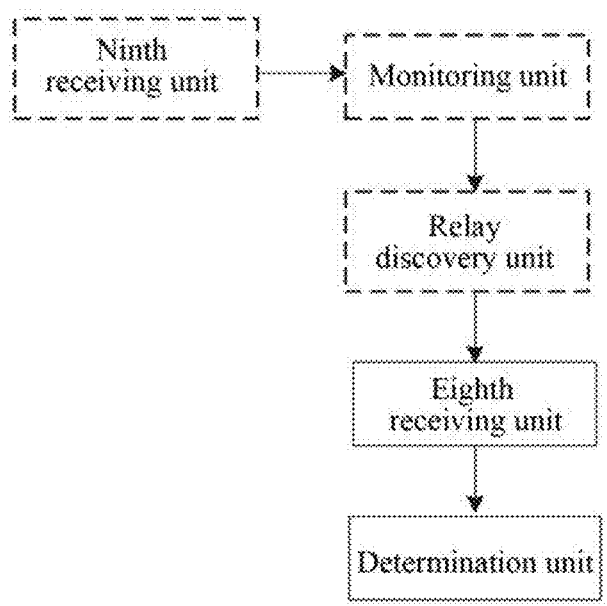
FIG. 13 illustrates a structural diagram of another piece of user equipment for realizing device-to-device communication relay selection according to an embodiment of the present disclosure.

FIG. 13 illustrates a structural diagram of another piece of user equipment for realizing device-to-device communication relay selection according to an embodiment of the present disclosure. As illustrated in FIG. 13, the user equipment includes: an eighth receiving unit and a determination unit, herein, the eighth receiving unit is configured to receive relay-related information sent by an adjacent relay node; and the determination unit is configured to select or configure an access relay node.

The user equipment provided by an embodiment of the present disclosure further includes a ninth receiving unit and a monitoring unit, herein, the ninth receiving unit is configured to, before the eighth receiving unit receives the relay-related information, receive a relay reception resource pool and/or a relay selection threshold sent or preconfigured by a network control node through broadcasting or dedicated signaling; and the monitoring unit is configured to monitor the relay reception resource pool and receive the relay-related information sent by a relay node.

The user equipment provided by an embodiment of the present disclosure further includes a relay discovery unit configured to, when the sixth receiving unit is not capable of receiving the relay-related information sent by the relay node by monitoring the relay reception resource pool, send a relay discovery message through broadcasting, such that the user equipment monitors the relay-related information sent by the relay node.

The determination unit is configured to select or configure an access relay node according to the relay-related information.

The determination unit is configured to configure/reconfigure one or more relay access nodes according to the relay selection threshold, a predefined rule and acquired relay-related information.

The methods provided by the present disclosure will be clearly described below in detail through specific embodiments. An embodiment is not used for limiting the protection scope of the present disclosure. The technical problem to be solved by an embodiment of the present disclosure is a relay selection problem of UE-to-network relay and UE-to-UE relay in a device-to-device communication system. An embodiment gives specific possible relay and access relay node selection methods and related signaling processes.

Embodiment 1 to embodiment 5 describe processes that a base station and user equipment select a relay node or autonomously judge whether to become a relay node.

Embodiment 1

Officer A, B, C and D (Officer A, B, C and D generally refer to working personnel using user equipment) respectively use public security user equipment UE1, UE2, UE3 and UE4 having a D2D function. Officer A, B, C and D all subscribe to public security services. At a rescue place, UE1 and UE2 are in a state of being covered by a network and UE3 and UE4 are not covered by a network. In consideration of that an adjacent base station is damaged, UE1 and UE2 covered by a network both have an interest in becoming a relay node to provide relay services for UE3 and UE4. For example, UE1 and UE2 both are interested in becoming a UE-to-network relay.

Figure 14:
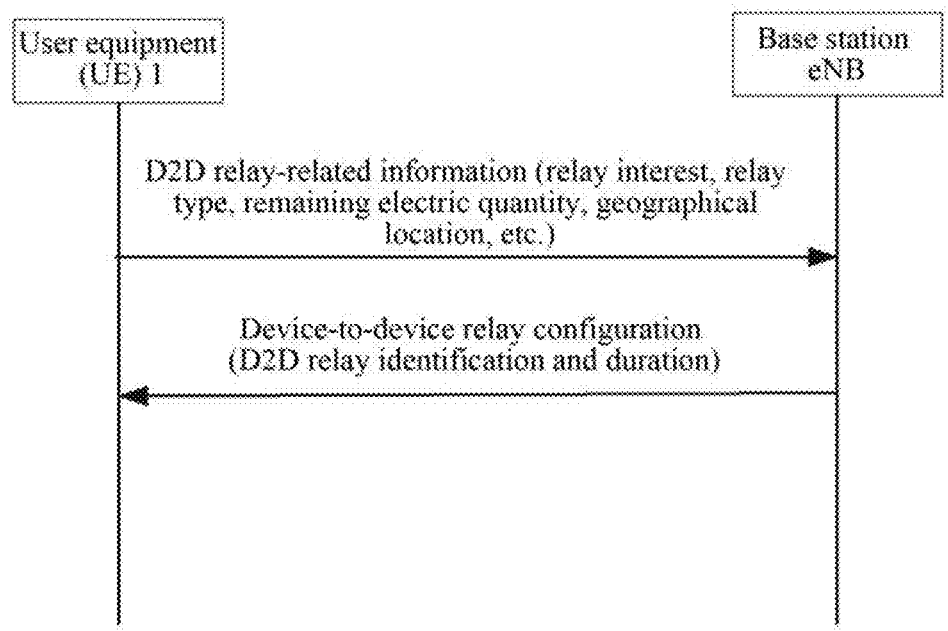
FIG. 14 illustrates a schematic diagram of information interaction for realizing device-to-device communication relay selection according to embodiment 1 of the present disclosure.

At this moment, UE1 and UE2 may send D2D relay-related information to a network control node (hereunder description is made by taking a base station as the network control node), which includes a relay interest indication and a relay type expected to become (which may be UE-to-network relay and/or UE-to-UE relay), and may further includes a remaining power level of UE (if UE is a plug-in UE, the remaining power level may be indicated as infinite) and a current geographical location of UE. FIG. 14 illustrates a schematic diagram of information interaction for realizing device-to-device communication relay selection according to embodiment 1 of the present disclosure. As illustrated in FIG. 14, after the base station receives the D2D relay-related information sent by UE1 and UE2, if it is found that UE1 and UE2 are close according to geographical locations and there are no other usable relay nodes around UE1 and UE2, the base station may randomly select one from UE1 and UE2 as a UE-to-network relay node. Supposing that UE1 is selected as a relay node, the base station sends to UE1 a device-to-device communication relay configuration, which contains UE-to-network relay configuration setup information; and alternatively, it may contains fields of a relay identification, and/or a relay type, and/or a relay time length/relay time period, a relay sending and/or receiving resource and the like. Besides, the base station may also select or release a relay node according to a predefined rule and received relay-related information of UE. For example, UE1 is selected as a UE-to-network relay node according to that the remaining power level of UE1 is high and the geographical location is located at an edge of a cell. At the same time, if the base station receives a report of UE5 which has already been configured as a UE-to-network relay node and finds that the remaining power level of UE5 is low or UE5 moves to a center of the cell and UE5 has been not suitable for being used as a relay node, the base station may send to UE5 a device-to-device communication relay configuration, which contains UE-to-network relay configuration release information.

UE1 receives the device-to-device communication relay configuration sent by the base station and executes the setup of relay function according to the device-to-device communication relay configuration, and UE5 may execute the release of relay function according to the device-to-device communication relay configuration.

In addition to that UE actively send a user equipment interest to the base station, if the base station supports a device-to-device communication relay function, before the relay node selection is triggered, the request information of relay-related information may be firstly sent to UE having a relay capability or a report configuration of relay-related information is sent to UE having a relay capability, herein the report configuration of relay-related information includes the event report or periodic report, a relay-related information type which needs to be reported and the like, such that the base station can continuously receive updated state information of UE having a relay capability. If it is found that the relay-related information of UE changes, e.g., the change of the relay load state, the information of the monitored user equipment seeking relay, and the mobility state/remaining power level reported by user equipment which has already been configured as a device-to-device communication relay node exceeds a system preconfigured threshold, the base station may perform the release or reconfiguration of relay node.

In addition to the above-mentioned relay interest, the relay type expected to become, the remaining power level of UE and the current geographical location of UE, the D2D relay-related information sent by UE to the base station may further contain one or more information such as a device-to-device communication group to which UE belongs, a relay usable time period of UE, a mobility state indication of UE, a relay transmitting-receiving capability of UE, a processing capability of UE, a relay charging demand of UE, and a cellular and device-to-device communication service traffic of UE. For UE which has already been a relay node, when it is triggered periodically or by an event to report D2D relay state information to the base station, the relay load state of UE may also be reported. Herein, the relay usable time period of UE refers to a time period at which UE is usable for device-to-device communication relay; the mobility state indication of UE includes rapid, medium, slow and other different moving speed indications; the relay transmitting-receiving capability of UE refers to whether UE has dedicated transceiver hardware for relay transmitting-receiving; the processing capability of UE refers to a hardware configuration capability or capability level of user equipment, a difference reflecting the number of CPU and/or a main frequency and/or an internal memory of user equipment or data packet processing efficiency; the relay charging demand of UE refers to price compensation per data unit or time unit expected by user equipment for relay data forwarding; the current cellular service traffic of UE includes a current uplink and/or downlink cellular traffic of UE; the current device-to-device communication service traffic of UE includes a current device-to-device communication discovery and/or communication data traffic of UE; and the relay load state of UE may be a data traffic forwarded by UE as a relay and may also be a load indication relay-forwarded by UE, such as high, medium and low. The base station may comprehensively consider the above-mentioned information and select or release a relay node. For example, it is predetermined to select the following user equipment with the following relay-related information as a relay node: user equipment with a high remaining power level, and/or a low mobility state, and/or a good cellular link quality, and/or a geographical location at an edge of a non-covered area, and/or a geographic location at an edge of a cell, and/or a strong processing capability, and/or a low charging requirement and/or a low cellular and device-to-device communication service traffic; and it is predetermined to release the following relay node with the following features: user equipment with a low remaining power level, and/or a high mobility state, and/or a geographical location at a center of a cell, and/or a weak processing capability, and/or a high charging requirement and/or a high cellular and device-to-device communication service traffic.

Embodiment 2

Mary, John and Peter respectively hold UE1, UE2 and UE3 having D2D communication and relay functions. UE1 and UE2 each other are in a D2D communication range, UE2 and UE3 each other are in a D2D communication range and UE1 and UE3 each other are not in a D2D communication range. UE1, UE2 and UE3 may obtain D2D relay reception resource pool information through preconfiguration, and may also receive D2D relay resource pool information sent by a base station through broadcasting or dedicated signaling. Supposing that UE1 expects to send a data packet by means of relay to UE3 which is not in a D2D communication range, UE1 may use resources of a D2D relay resource pool to send a broadcast message for seeking D2D relay. Supposing that UE2 has an intention/interest/indication to become a relay node, UE2 may monitor the D2D relay resource pool and check whether there is a UE which is seeking a D2D relay.

Figure 15:
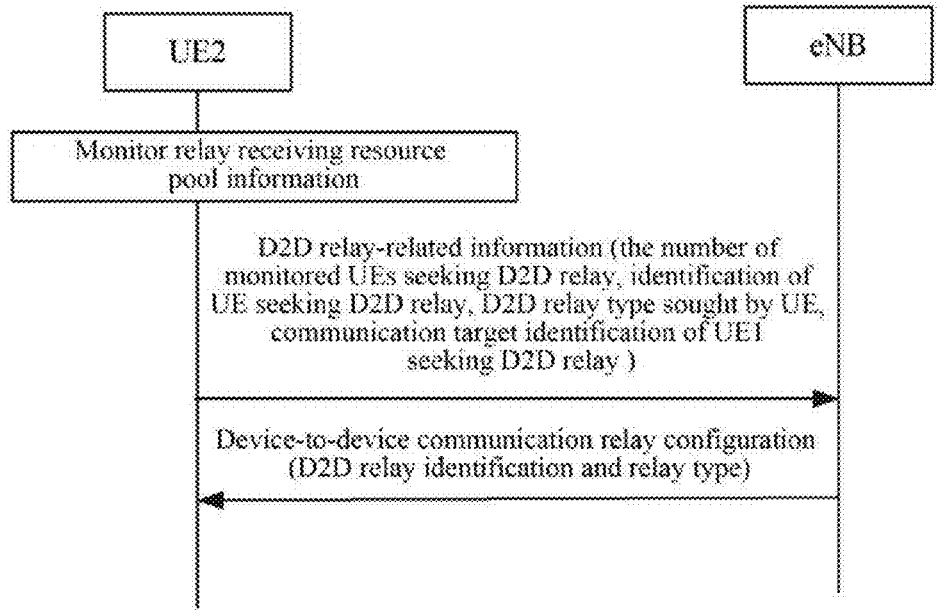
FIG. 15 illustrates a schematic diagram of information interaction for realizing device-to-device communication relay selection according to embodiment 2 of the present disclosure.

Supposing that UE2 monitors D2D relay seeking information sent by UE1, UE2 may send D2D relay-related information to the base station. FIG. 15 illustrates a schematic diagram of information interaction for realizing device-to-device communication relay selection according to embodiment 2 of the present disclosure. As illustrated in FIG. 15, information of D2D relay finding UE1 monitored by UE2 includes one or more kinds of information of the number of monitored UE seeking the D2D relay, an identification of UE seeking D2D relay, a D2D relay type sought by UE, a communication target identification (identification of UE3) of UE1 seeking the D2D relay, whether UE2 and the communication target node UE3 of UE1 are capable of discovering each other, a measurement result of measurement performed by UE2 to UE1 seeking D2D relay (signal intensity measurement performed by UE2 to relay finding user equipment or measurement performed to a corresponding reference signal similar to RSRP/RSRQ), traffic and service quality demands of UE1 seeking D2D relay, a coverage state of UE1 seeking D2D relay, a serving cell identification of UE1 seeking D2D relay and the like. The above-mentioned information partially is obtained by UE2 by receiving D2D relay finding broadcast message sent by UE1, and partially is obtained through measurement performed by UE2.

After the base station receives the D2D relay-related information sent by UE2, if UE2 is capable of discovering the target communication node UE3 of UE1 seeking relay and at this moment there is only one candidate relay node UE2, the base station selects UE2 as a UE-to-UE relay node for D2D communication between UE1 and UE3. If the base station receives reports of a plurality of UE having a D2D relay capability and the plurality of UE all are capable of simultaneously discovering UE1 and UE3, the base station may randomly select one from these candidate user equipment as a UE-to-UE relay node. Supposing that UE2 is selected as a relay node, the base station sends to UE2 a device-to-device communication relay configuration, which contains UE-to-UE relay configuration setup information, and alternatively may contain fields of a relay identification, a relay type, a relay time length/relay time period, a relay resource configuration and the like. Besides, the base station may also select or release a relay node according to a predefined rule and received relay-related information of UE.

UE2 receives the device-to-device communication relay configuration sent by the base station and executes the setup of relay function according to the device-to-device communication relay configuration. Thereafter, relay forwarding of D2D data between UE1 and UE3 may be performed.

Embodiment 3

Officer A, B, C and D respectively use public security user equipment UE1, UE2, UE3 and UE4 having a D2D function. Officer A, B, C and D all subscribe to public security services. At a rescue place, UE1 and UE2 are in a state of being covered by a network and UE3 and UE4 are not covered by a network. In consideration of that an adjacent base station is damaged, UE1 and UE2 covered by a network both have an interest in becoming a relay node to provide relay services for UE not covered by a network. For example, UE1 and UE2 both are interested in becoming a UE-to-network relay.

Figure 16:
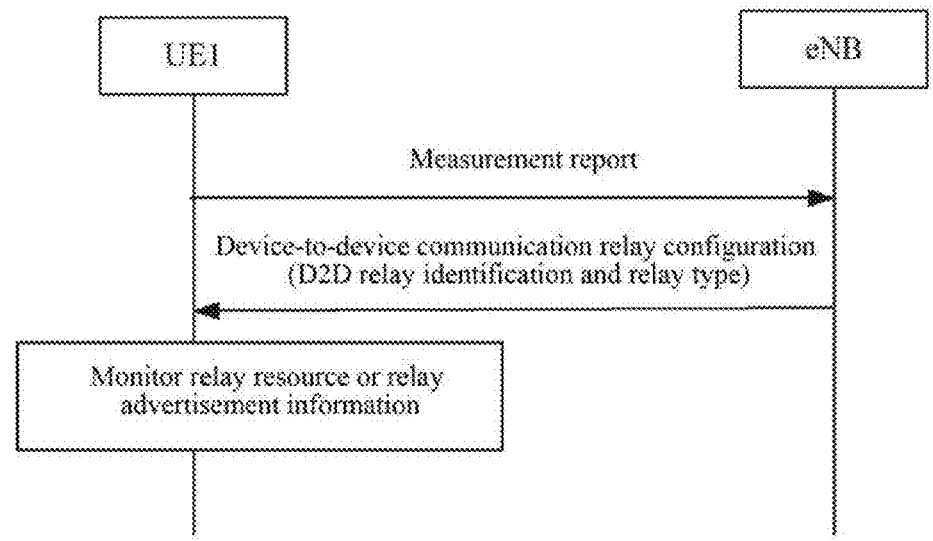
FIG. 16 illustrates a schematic diagram of information interaction for realizing device-to-device communication relay selection according to embodiment 3 of the present disclosure.

UE1 and UE2 may send a measurement report of measurement performed to a serving cell and an adjacent cell to a base station, herein the measurement report includes measurement values of measurement performed to RSRP and RSRQ of the serving cell and the adjacent cell. FIG. 16 illustrates a schematic diagram of information interaction for realizing device-to-device communication relay selection according to embodiment 3 of the present disclosure. As illustrated in FIG. 16, after the base station receives the measurement report sent by UE1, a relative location of UE is judged according to the measurement result sent by UE1. If the measurement result performed by UE1 to RSRP of the serving cell is greater than a given threshold, the base station considers that UE1 has a basic condition of becoming a relay and the base station may select UE1 as a UE-to-network relay node and send to UE1 a device-to-device communication relay configuration, which contains UE-to-network relay configuration setup information; and alternatively it may contain fields of a relay identification, a relay type, a relay time length/relay time period, a relay resource configuration and the like. If the measurement result of measurement performed by UE1 to RSRP of the serving cell is less than the given threshold, the base station considers that UE1 is located at an edge of a cell; and if the measurement results of measurement performed by UE1 to RSRP of all adjacent cells are less than the given threshold or UE1 does not detect adjacent cells, the base station may further consider that UE1 is located at an edge of an area covered by a network, and the base station may preferentially select UE1 as a UE-to-network relay node and send to UE1 a device-to-device communication relay configuration, which contains UE-to-network relay configuration setup information; and alternatively, it may contain fields of a relay identification, a relay type, a relay time length/relay time period and the like.

Supposing that UE2 originally has already been selected as a UE-to-network relay node by the base station and the measurement result of measurement performed by UE2 to RSRP of the serving cell in the measurement report reported by UE2 is higher than the given threshold with the movement of UE2, the base station considers that UE2 is located at a center of a cell and has already been not suitable for being used as a UE-to-network relay node, and thus the base station sends to UE2 a device-to-device communication relay configuration, which contains UE-to-network relay configuration release information.

UE1 receives the device-to-device communication relay configuration sent by the base station, executes the setup of relay function according to the device-to-device communication relay configuration and starts sending D2D relay advertisement information through broadcasting, herein the D2D relay advertisement information may include one or more kinds of information of a relay identification, a relay type, a relay serving cell identification, a relay usable time period, an identification of a group to which the relay belongs, a relay mobility state indication, a relay charging demand, relay PLMN information, a relay forbidden state indication and the like.

Embodiment 4

Officer A, B, C and D respectively use public security user equipment UE1, UE2, UE3 and UE4 having a D2D function. Officer A, B, C and D all subscribe public security services. At a rescue place, UE1 and UE2 are in a state of being covered by a network and UE3 and UE4 are not covered by a network. In consideration of that an adjacent base station is damaged, UE1 and UE2 covered by a network both have an interest in becoming a relay node to provide relay services for UE not covered by a network. For example, UE1 and UE2 both are interested in becoming a UE-to-network relay.

Figure 17:
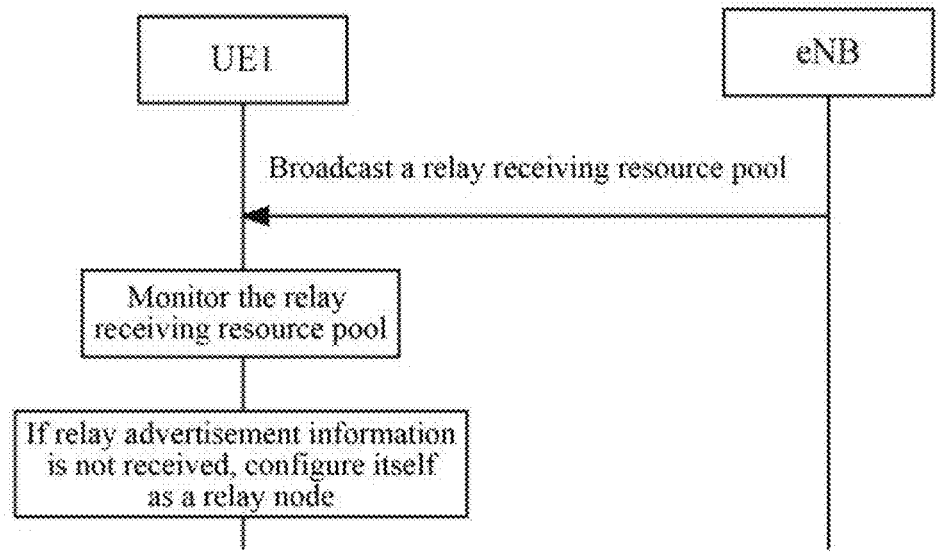
FIG. 17 illustrates a schematic diagram of information interaction for realizing device-to-device communication relay selection according to embodiment 4 of the present disclosure.

UE1 and UE2 may obtain D2D relay resource pool information and relay selection threshold information through preconfiguration, and may also receive D2D relay resource pool information and relay selection threshold information sent by a base station through broadcasting. A relay threshold includes a serving cell link quality measurement minimum threshold, and/or a remaining power level threshold and/or a mobility state threshold. Supposing that UE1 is in an idle state, UE1 judges whether the relay threshold is satisfied according to a measurement result thereof, and starts to monitor a D2D relay reception resource pool if the relay threshold is satisfied. FIG. 17 illustrates a schematic diagram of information interaction for realizing device-to-device communication relay selection according to embodiment 4 of the present disclosure. As illustrated in FIG. 17, when UE1 monitors that there is no relay advertisement information sent by an adjacent D2D relay node through broadcasting, UE1 considers that there is no relay node around, and UE1 may wait for random time in a given time range, then execute a D2D relay function according to preconfiguration and starts sending a D2D relay advertisement message through broadcasting. For UE2, if at this moment UE2 monitors that there is a D2D relay advertisement message sent by an adjacent relay node through broadcasting, and UE2 further judges a relay type of an adjacent device-to-device communication relay user equipment and a measurement result of measurement performed to the received relay advertisement information. If UE2 is capable of detecting the relay advertisement information sent by UE1 through broadcasting but a signal measurement value of the corresponding relay advertisement information is lower than the given threshold, UE2 also configures UE2 as a relay node. If UE2 is not capable of detecting the relay advertisement information sent by UE1 through broadcasting or the signal measurement value of the corresponding advertisement information is higher than or equal to the given threshold although UE2 is capable of detecting the relay advertisement information sent by UE1 through broadcasting, UE2 does not configure UE2 as a relay node.

Besides, UE1 and UE2 may also configure or release their relay functions according to other predefined rules or relay-related information of user equipment. For example, it is predetermined to select the following user equipment with the following relay-related information as a relay node: user equipment with a high remaining power level, and/or a low mobility state, and/or a good cellular link quality, and/or a geographical location at an edge of a non-covered area, and/or a geographic location at an edge of a cell, and/or a strong processing capability, and/or a low charging requirement and/or a low cellular and device-to-device communication service traffic; and it is predetermined to release the relay function of the following relay node with the following features: user equipment with a low remaining power level, and/or a high mobility state, and/or a geographical location not at an edge of a non-covered area any longer, and/or a geographical location at a center of a cell, and/or a weak processing capability, and/or a high charging requirement and/or a high cellular and device-to-device communication service traffic.

After UE1 selects or configures UE1 as a relay node according to relay-related information of user equipment, if subsequently UE1 enters a connected state and receives a relay configuration performed by the base station to the user equipment, the relay configuration sent by the base station is capable of overlaying an autonomous relay configuration of the user equipment.

Embodiment 5

Officer A and B respectively use public security user equipment UE1 and UE2 having a D2D function. Officer A and B both subscribe to public security services. At a rescue place, UE1 is in a state of being covered by a network and UE2 is not covered by a network. UE1 covered by a network has an interest in becoming a relay node to provide relay services for UE not covered by a network, i.e., is interested in becoming a UE-to-network relay.

Figure 18:
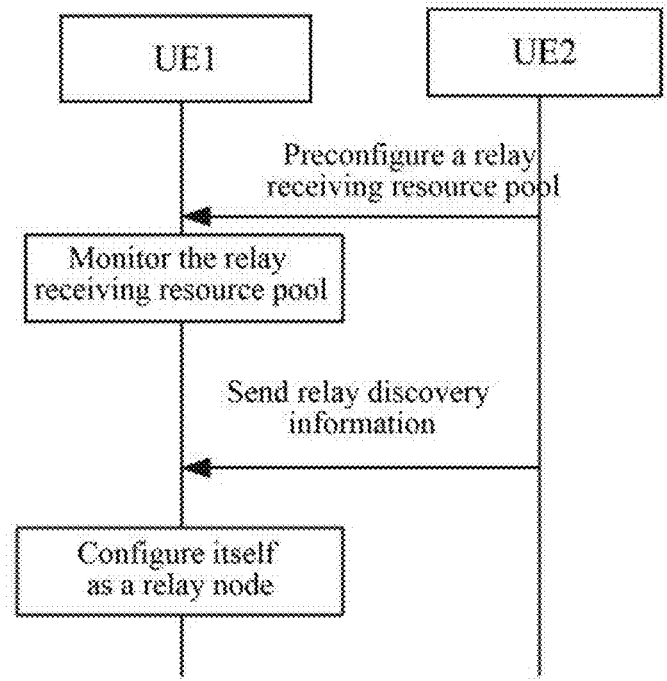
FIG. 18 illustrates a schematic diagram of information interaction for realizing device-to-device communication relay selection according to embodiment 5 of the present disclosure.

FIG. 18 illustrates a schematic diagram of information interaction for realizing device-to-device communication relay selection according to embodiment 5 of the present disclosure. As illustrated in FIG. 18, UE1 and UE2 may obtain D2D relay reception resource pool information through preconfiguration, and UE1 may also receive D2D relay reception resource pool information sent by a base station through broadcasting. UE1 which is interested in becoming a UE-to-network relay monitors a D2D relay reception resource pool. If D2D relay seeking information sent by UE2 through broadcasting is capable of being monitored, UE1 configures a relay function of UE1 according to preconfiguration and executes UE-to-network relay forwarding.

Embodiment 6 to embodiment 9 describe processes that a base station and user equipment select a relay node.

Embodiment 6

Officer A, B and C respectively use public security user equipment UE1, UE2 and UE3 having a D2D function. Officer A, B and C all subscribe to public security services. At a rescue place, UE1 is in a state of being not covered by a network and UE2 and UE3 both are in a state of being covered by a network. In consideration of that an adjacent base station is damaged, UE2 and UE3 covered by a network both have an interest in becoming a relay node to provide relay services for UE not covered by a network. For example, UE1 and UE2 both are interested in becoming a UE-to-network relay and have already been configured by a network as UE-to-network relay nodes.

Figure 19:
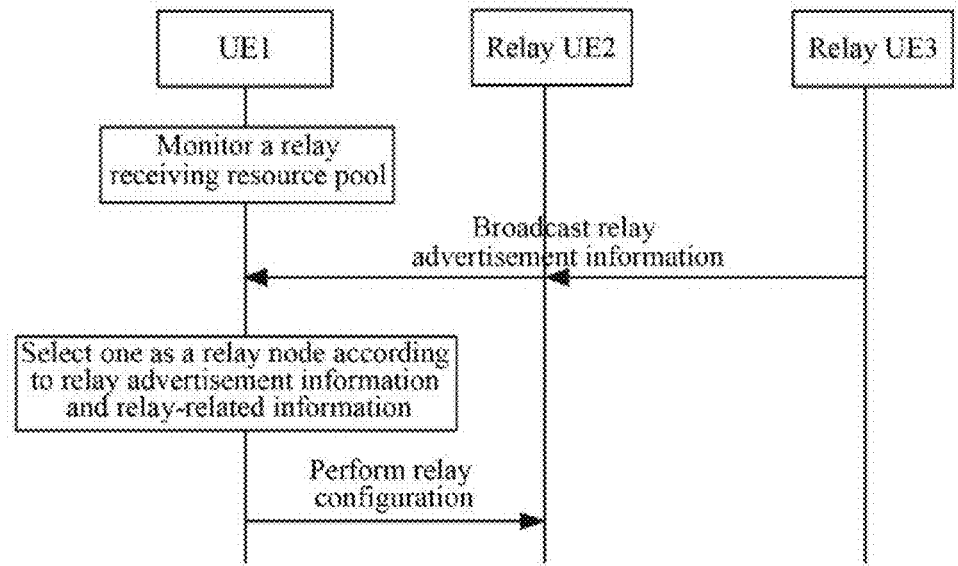
FIG. 19 illustrates a schematic diagram of information interaction for realizing device-to-device communication relay selection according to embodiment 6 of the present disclosure.

UE1 monitors a relay reception resource pool according to the preconfigured relay reception resource pool and detects whether there is relay-related information sent by an adjacent node through broadcasting. FIG. 19 illustrates a schematic diagram of information interaction for realizing device-to-device communication relay selection according to embodiment 6 of the present disclosure. As illustrated in FIG. 19, the relay-related information may include one or more of the following information: a relay node identification, a relay node remaining power level, a device-to-device communication group to which a relay node belongs, a relay usable time period of a relay node, a relay type, a mobility state indication of a relay node, a relay transmitting-receiving capability of a relay node, a processing capability of a relay node, a relay charging demand of a relay node, a covering state of a relay node, a serving cell identification of a relay node, a minimum number of hops from a relay node to a network node, a relay load state of a relay node, an access forbidden state of a relay node, PLMN information of a relay node and the like. Herein, the relay usable time period refers to a time period at which a relay node executes a device-to-device communication relay function; the mobility state indication includes rapid, medium, slow and other different moving speed indications; the relay transmitting-receiving capability refers to whether UE has dedicated transceiver hardware for relay transmitting-receiving; the processing capability refers to a hardware configuration capability or capability level of user equipment, a difference reflecting a number of CPU and/or a main frequency and/or an internal memory of user equipment or data packet processing efficiency; the relay charging demand refers to price compensation per data unit or time unit expected by a relay node for relay data forwarding; and the relay load state may be a data traffic forwarded by UE as a relay and may also be a load indication relay-forwarded by UE, such as high, medium and low. Besides, the relay-related information further includes a result of measurement performed by UE1 to a signal of relay-related information sent by a relay node.

Supposing that UE1 monitors relay advertisement information sent by UE2 and UE3, UE1 acquires relay-related information contained therein. UE1 judges measurement results of measurement performed to UE2 and UE3 satisfy a relay selection minimum device-to-device communication link quality threshold according to a preconfigured relay selection threshold. If the threshold is not satisfied, UE1 continuously monitors whether there is relay discovery information sent by other UE around. If the threshold requirement is not satisfied, UE1 continuously selects a relay access node according to a predefined rule and the acquired relay-related information, e.g., selects a relay node with a high remaining power level, or a low mobility state, or a geographical location adjacent to the user equipment, or a strong processing capability, or a low cellular and device-to-device communication service traffic, or a low relay load, or a relay access forbidden state which is a non-forbidden state, or a PLMN/D2D group consistent with the user equipment, as an access relay node. The predefined rule may be preconfigured or sent by the base station through broadcasting or dedicated signaling, and includes a remaining power level requirement of relay node, or a geographical location requirement of relay node (which is determined according to whether a measurement value of measurement performed by user equipment to a signal of a relay node satisfies a given threshold), or a mobility state requirement of relay node, or a processing capability requirement, or a cellular and device-to-device communication service traffic requirement, or a load requirement of relay node or the like. Supposing that the preconfigured predefined rule is a geographical location requirement, it is required that UE selects a relay node with the largest measurement value of the signal of the relay node. Supposing that the signal intensity, measured by UE1, of the relay advertisement information sent by UE2 is higher than that of UE3, UE1 selects UE2 as a relay access node and starts accessing to perform D2D data forwarding.

Embodiment 7

Officer A, B, C and D respectively use public security user equipment UE1, UE2, UE3 and UE4 having a D2D function. Officer A, B, C and D all subscribe to public security services. At a rescue place, UE1, UE2, UE3 and UE4 all are in a state of being not covered by a network. UE1, UE2 and UE3 each other are in a D2D communication range, UE2, UE3 and UE4 each other are in a D2D communication range, and UE1 and UE4 each other are not in a D2D communication range. UE1, UE2, UE3 and UE4 not covered by a network all have an interest in becoming a UE-to-UE relay node to provide relay services for UE not covered by a network.

Figure 20:
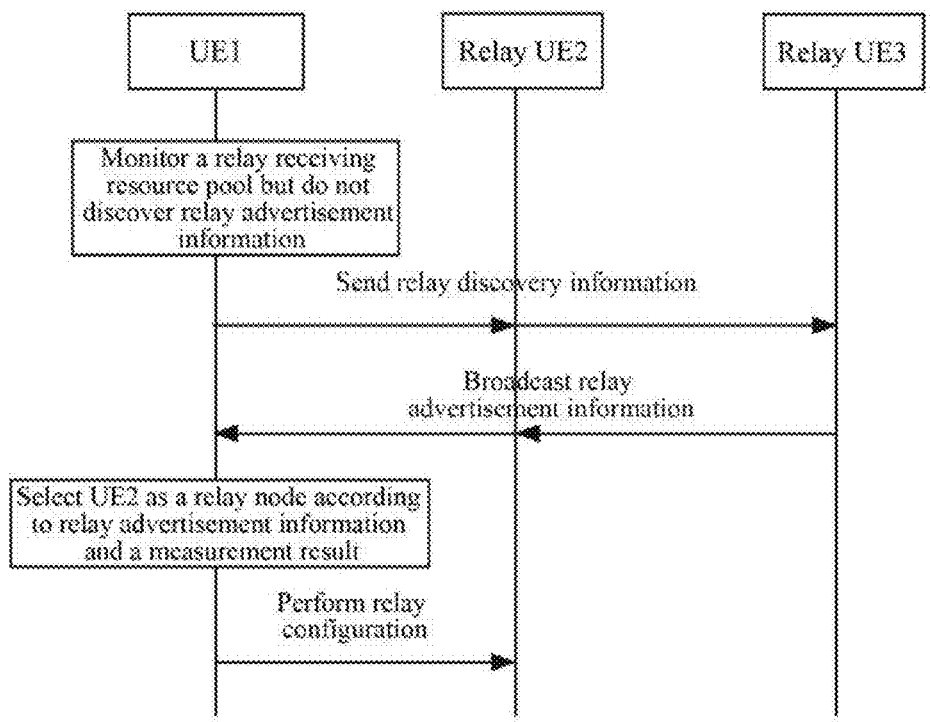
FIG. 20 illustrates a schematic diagram of information interaction for realizing device-to-device communication relay selection according to embodiment 7 of the present disclosure.

UE1 expects to perform relay-based D2D communication with UE4. Firstly UE1 monitors a relay reception resource pool according to preconfigured relay reception resource pool information and detects whether there is relay-related information sent by an adjacent node through broadcasting. FIG. 20 illustrates a schematic diagram of information interaction for realizing device-to-device communication relay selection according to embodiment 7 of the present disclosure. As illustrated in FIG. 20, if UE1 monitors no relay advertisement information sent by an adjacent node through broadcasting, UE1 sends a message for seeking D2D relay, i.e., a relay discovery message, through broadcasting on the relay reception resource pool. The broadcast message for seeking D2D relay may include an identification of UE1, a D2D relay type sought by UE1 (UE-to-UE relay), a communication target identification of UE1 (identification of UE4), traffic and service quality demands of UE1 and the like.

UE2 and UE3 which have an interest in becoming a UE-to-UE relay node monitor the relay reception resource pool according to the preconfigured relay reception resource pool information and detect whether there is relay-related information sent by an adjacent node through broadcasting. Supposing that UE2 and UE3 both receive the message for seeking D2D relay sent by UE1, and UE2 and UE3 both are capable of discovering UE4 and performing D2D communication with UE4, UE2 and UE3 send relay advertisement information containing relay-related information, which includes one or more information of a relay node identification, a relay node remaining power level, a device-to-device communication group to which a relay node belongs, a relay node usable time period of a relay node, a relay type, a mobility state indication of a relay node, a relay transmitting-receiving capability of a relay node, a processing capability of a relay node, a relay charging demand of a relay node, a coverage state of a relay node, a serving cell identification of a relay node, a minimum number of hops from a relay node to a network node, a relay load state of a relay node, an access forbidden state of a relay node, PLMN information of a relay node and the like. Herein, the relay usable time period refers to a time period at which a relay node executes a device-to-device communication relay function; the mobility state indication includes rapid, medium, slow like different moving speed indications; the relay transmitting-receiving capability refers to whether UE has dedicated transceiver hardware for relay transmitting-receiving; the processing capability refers to a hardware configuration capability or capability level of user equipment, a difference reflecting a number of CPU and/or a main frequency and/or an internal memory of user equipment or data packet processing efficiency; the relay charging demand refers to price compensation per data unit or time unit expected by a relay node for relay data forwarding; and the relay load state may be a data traffic forwarded by UE as a relay and may also be a load indication relay-forwarded by UE, such as high, medium and low. Besides, the relay-related information further includes a result of measurement performed by UE1 to a signal of relay-related information sent by a relay node.

Supposing that UE1 monitors relay advertisement information sent by UE2 and UE3, UE1 acquires relay-related information contained therein. Then, UE1 selects a relay access node according to a predefined rule and the acquired relay-related information, e.g., it selects a relay node with a high remaining power level, or a low mobility state, or a geographical location adjacent to the user equipment, or a strong processing capability, or a low cellular and device-to-device communication service traffic, or a low relay load, or a relay access forbidden state which is a non-forbidden state, or a PLMN/D2D group consistent with the user equipment, as an access relay node. The predefined rule may be preconfigured or sent by the base station through broadcasting or dedicated signaling, and includes a remaining power level requirement of relay node, a geographical location requirement of relay node (which is determined according to whether a measurement value of measurement performed by user equipment to a signal of a relay node satisfies a given threshold), a mobility state requirement of relay node, a processing capability requirement, a cellular and device-to-device communication service traffic requirement and a load requirement of relay node. Supposing that the preconfigured predefined rule is a mobility state requirement of relay node, it is required that UE selects a relay node with the slowest mobility state. Supposing that the mobility state of UE2 is slower than that of UE3, UE1 selects UE2 as a relay access node and starts accessing to perform D2D data forwarding.

Embodiment 8

Mary, John, Peter and Rose respectively hold UE1, UE2, UE3 and UE4 having D2D communication and relay functions. UE1, UE2 and UE3 each other are in a D2D communication range, UE2, UE3 and UE4 each other are in a D2D communication range, and UE1 and UE4 each other are not in a D2D communication range.

Figure 21:
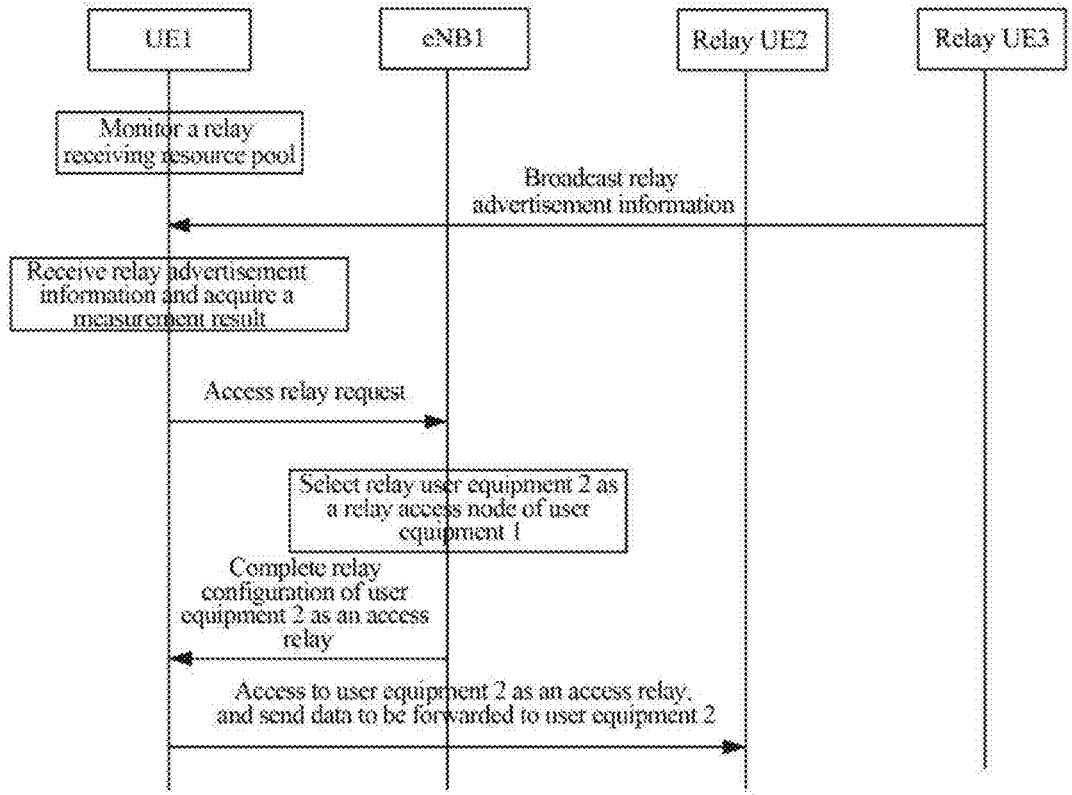
FIG. 21 illustrates a schematic diagram of information interaction for realizing device-to-device communication relay selection according to embodiment 8 of the present disclosure.

UE1 expects to perform a relay-based D2D communication with UE4. Firstly UE1 monitors preconfigured relay reception resource pool information and detects whether there is relay-related information sent by an adjacent node through broadcasting. FIG. 21 illustrates a schematic diagram of information interaction for realizing device-to-device communication relay selection according to embodiment 8 of the present disclosure. As illustrated in FIG. 21, it is supposed that at this moment UE2 and UE3 both are configured as a D2D relay node, support UE-to-UE relay and send D2D relay advertisement information. UE1 collects the D2D relay advertisement information sent by adjacent nodes UE2 and UE3 through broadcasting and performs measurement to D2D relay advertisement signals.

Thereafter, UE1 sends a relay request to eNB, which may include relay configuration request information; and alternatively, it may include a requested relay type, a D2D communication group to which UE1 belongs, a geographical location of UE1, and relay node related information sent by a monitored relay node through broadcasting.

After the relay request information sent by UE1, eNB judges an adjacent relay node according to the geographical location of UE1 and acquires relay-related information corresponding to the adjacent relay node. The relay-related information corresponding to the adjacent relay node may be reported by UE1 to eNB through a relay request; or UE1 only sends the monitored relay node identification, and eNB determines the related information of the corresponding relay node according to previous configuration thereof or requests the relay node to send the relay-related information to eNB through the dedicated signaling.

The eNB judges the relay type requested by the user equipment, finds out a set of relay nodes corresponding to the relay type and adjacent to the user equipment, and it may randomly select an access relay node for UE1, or eNB configures or reconfigures an access relay node for UE1 according to a predefined rule and relay-related information. For example, a relay node with a high remaining power level, and/or a low mobility state, and/or a geographical location adjacent to the user equipment, and/or a strong processing capability, and/or a low charging requirement, and/or a low cellular and device-to-device communication service traffic, and/or a low relay load, and/or a relay access forbidden state which is a non-forbidden state, and/or a PLMN/D2D group consistent with the user equipment, may be selected. Supporting that eNB finally selects UE2 as a UE-to-UE relay access node of UE1, eNB sends an access relay node configuration to UE1, herein the device-to-device communication relay access configuration may include configuration of setup, release or modification of the access relay node.

UE1 receives the access relay node configuration information sent by eNB, then executes the setup of the access relay node configuration according to the access relay node configuration, and starts accessing to the access relay node UE2 to perform D2D data forwarding communication.

Embodiment 9

Mary, John, Peter and Rose respectively hold UE1, UE2, UE3 and UE4 having D2D communication and relay functions. UE1, UE2 and UE3 each other are in a D2D communication range, UE2, UE3 and UE4 each other are in a D2D communication range, and UE1 and UE4 each other are not in a D2D communication range.

Figure 22:
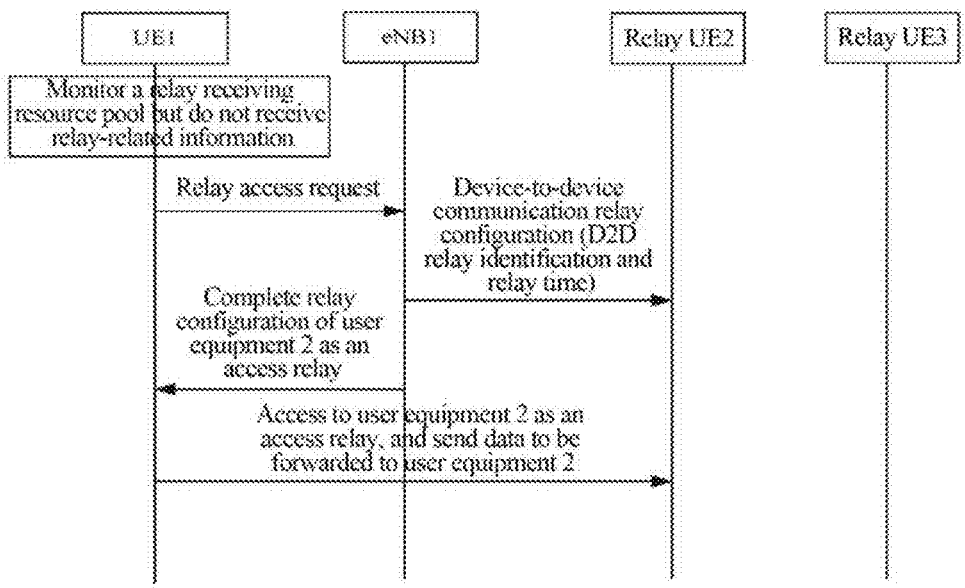
FIG. 22 illustrates a schematic diagram of information interaction for realizing device-to-device communication relay selection according to embodiment 9 of the present disclosure.

UE1 expects to perform the relay-based D2D communication with UE4. Firstly UE1 monitors a relay reception resource pool according to preconfigured relay reception resource pool information and detects whether there is relay-related information sent by an adjacent node through broadcasting. FIG. 22 illustrates a schematic diagram of information interaction for realizing device-to-device communication relay selection according to embodiment 9 of the present disclosure. As illustrated in FIG. 22, supposing that UE1 does not detect any D2D relay advertisement information, UE1 sends to eNB a relay request, which may include relay configuration request information which may contains a requested relay type, a D2D communication group to which UE1 belongs, a geographical location of UE1 and the like.

After the relay request information of UE1 is received, eNB judges adjacent user equipment having a D2D relay capability according to the geographical location of UE1, and sends a relay information request to the UE having the relay capability or sends a report configuration of relay-related information to the UE having the relay capability, herein the report configuration of the relay-related information includes event report or periodic report, a type of relay-related information which needs to be reported and the like, such that eNB may continuously receive updated state information of the UE having the relay capability.

If the base station receives reports of a plurality of UEs having the D2D relay capability, the base station may randomly select one from these candidate nodes as a UE-to-UE relay node. Supposing that UE2 is selected as a relay node, the base station sends to UE2 a device-to-device communication relay configuration, which contains UE-to-UE relay configuration setup information; and it specifically may contain fields of a relay identification, a relay type, a relay time length/relay time period and the like. UE2 receives the device-to-device communication relay configuration and executes relay function setup according to the device-to-device communication relay configuration.

Then, eNB sends an access relay node configuration to UE1, and the device-to-device relay access configuration may include an setup configuration of the access relay node, which contains identification information of the relay access node UE2. UE1 receives the access relay node configuration information sent by eNB, then it executes the setup of the access relay node configuration according to the access relay node configuration, and starts accessing to the relay node UE2 to perform D2D data forwarding communication.

Embodiment 10

Figure 23:
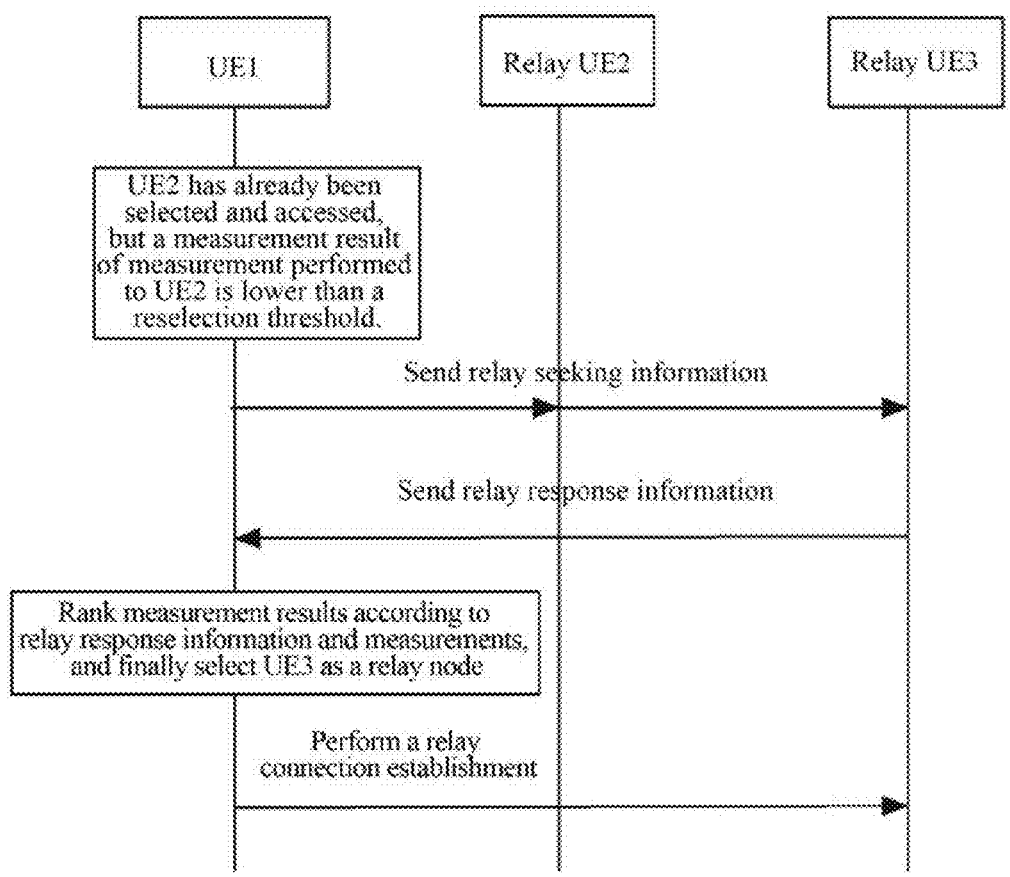
FIG. 23 illustrates a schematic diagram of information interaction for realizing device-to-device communication relay selection according to embodiment 10 of the present disclosure.

FIG. 23 illustrates a schematic diagram of information interaction for realizing device-to-device communication relay selection according to embodiment 10 of the present disclosure. As illustrated in FIG. 23, UE1 has already selected relay UE2 and established a connection with UE2 to perform data forwarding. Subsequently UE1 detects that a link measurement result (S2) of measurement performed to relay UE2 is lower than a relay reselection device-to-device communication link threshold, the user equipment starts to monitor a preconfigured relay reception resource pool. Supposing that UE1 monitors no relay discovery information (i.e., relay seeking information) sent by other adjacent relay nodes through broadcasting, UE1 sends a message for seeking D2D relay through broadcasting on a relay sending resource pool. Supposing that UE1 monitors relay response information sent by relay UE3, UE1 acquires relay-related information contained therein and performs measurement to signal intensity thereof, herein a measurement result is S3. Thereafter, UE1 performs ranking to (S2+relay reselection hysteresis value) and S3. If S3 is higher, UE1 selects relay UE3 as an access relay node and starts trying to establish a connection to perform D2D data forwarding.

One skilled in the art can understand that all or partial steps in the above-mentioned methods may be completed by relevant hardware (such as a processor) instructed by a program, and the program may be stored in a computer readable storage medium such as a read-only memory, a magnetic disc or a compact disc. Optionally, all or partial steps in the above-mentioned embodiments may also be implemented by using one or more integrated circuits. Correspondingly, each module/unit in the above-mentioned embodiments may be implemented by means of hardware, e.g., a corresponding function thereof may be implemented through an integrated circuit, and it may also be implemented by means of a software function module, e.g., a corresponding function thereof may be implemented through a processor which executes a program/instruction stored in a memory. The present disclosure is not limited to combinations of hardware and software in any specific form.

One skilled in the art shall understand that modifications or equivalent replacements may be made to the technical solution of the present disclosure without departing from the spirit and scope of the technical solution of the present disclosure, and however, these modifications or equivalent replacements shall be all included in the scope of the claims of the present disclosure.

INDUSTRIAL APPLICABILITY

The above-mentioned solution provides a corresponding solution for a scenario for which relay selection is not provided, and thereby selection of a relay node is realized.

What we claim is:

1. A method for realizing device-to-device communication relay selection, comprising:
sending, by a user equipment, relay-related information used for determining a relay node to a network control node; and
when the user equipment is determined as the relay node, receiving, by the user equipment, device-to-device communication relay configuration information sent by the network control node;
wherein the relay-related information comprises:
an indication that the user equipment supports device-to-device communication relay; and/or
a remaining power level of the user equipment; and/or a device-to-device communication group to which the user equipment belongs; and/or a measurement result of measurement performed by the user equipment to a serving cell and/or an adjacent cell;

wherein the method further comprises:

before the user equipment sends the relay-related information to the network control node, receiving, by the user equipment, a relay reception resource pool and/or relay threshold information sent or preconfigured by the network control node through broadcasting;

judging, by the user equipment, whether a relay threshold is satisfied according to the measurement result of measurement performed to the serving cell, and sending the relay-related information to the network control node only when the relay threshold is satisfied, wherein the relay threshold information comprises: a link quality measurement minimum threshold of the serving cell.

2. The method according to claim 1, wherein the relay-related information further comprises:

a relay intention/interest/indication of the user equipment; and/or a mobility state indication of the user equipment.

3. The method according to claim 1, wherein the device-to-device communication relay configuration information comprises:

configuration information about activation and/or setup, release and/or deactivation or modification of the relay node; and/or a relay identification, and/or relay type, and/or relay node device-to-device communication transmission and/or reception resource configuration.

4. The method according to claim 1, wherein the method further comprises:

after the user equipment determined as the relay node receives the device-to-device communication relay configuration information sent by the network control node, executing, by the user equipment, activation and/or setup, release and/or deactivation or modification of a relay function of the determined relay node according to the device-to-device communication relay configuration information.

5. A method for realizing device-to-device communication relay selection, comprising:

receiving, by a network control node, relay-related information sent by the user equipment, and determining a relay node; and sending, by the network control node, device-to-device communication relay configuration information to the determined relay node;

wherein the relay-related information comprises:

an indication that the user equipment supports device-to-device communication relay; and/or a remaining power level of the user equipment; and/or a device-to-device communication group to which the user equipment belongs; and/or a measurement result of measurement performed by the user equipment to a serving cell and/or an adjacent cell;

wherein the method further comprises:

before the network control node receives the relay-related information sent by the user equipment, sending, by the network control node, a relay reception resource pool and/or relay threshold information, wherein the relay threshold information comprises: a link quality measurement minimum threshold of a serving cell, and/or a remaining power level threshold and/or a mobility state threshold.

6. The method according to claim 5, wherein the relay-related information comprises:

a relay intention/interest/indication of the user equipment; and/or a mobility state indication of the user equipment.

7. The method according to claim 5, wherein the device-to-device communication relay configuration information comprises:

configuration information about activation and/or setup, release and/or deactivation or modification of the relay node; and/or a relay identification, and/or relay type and/or relay node device-to-device communication transmission and reception resource configuration.

8. The method according to claim 5, wherein the method further comprises:

after the network control node sends the device-to-device communication relay configuration information to the user equipment selected as the relay node, executing, by the user equipment, activation and/or setup, release and/or deactivation or modification of a relay function of the determined relay node according to the device-to-device communication relay configuration information.

9. User equipment for realizing device-to-device communication relay selection, comprising a memory storing instructions and a processor, which, when executing the instructions in the memory, is configured to:

send relay-related information used for determining a relay node to a network control node; and when the user equipment is determined as the relay node, receive device-to-device communication relay configuration information sent by the network control node;

wherein the relay-related information comprises:

an indication that the user equipment supports device-to-device communication relay; and/or a remaining power level of the user equipment; and/or a device-to-device communication group to which the user equipment belongs; and/or a measurement result of measurement performed by the user equipment to a serving cell and/or an adjacent cell;

before the user equipment sends the relay-related information to the network control node, receive a relay reception resource pool and/or relay threshold information sent or preconfigured by the network control node through broadcasting;

judge whether a relay threshold is satisfied according to the measurement result of measurement performed to the serving cell, and sending the relay-related information to the network control node only when the relay threshold is satisfied, wherein the relay threshold information comprises: a link quality measurement minimum threshold of the serving cell.

10. The user equipment according to claim 9, wherein the processor is configured to:

receive request information, sent by the network control node, of the relay-related information or relay information, wherein, when the request information of the relay-related information or the relay information is received, the processor sends the relay-related information.

11. The user equipment according to claim 9, wherein the processor is configured to:
  receive a relay reception resource pool and/or relay threshold sent or preconfigured by the network control node through broadcasting, monitor the relay reception resource pool.

12. The user equipment according to claim 9, wherein the processor is configured to:
  execute activation and/or establishment, release and/or deactivation or modification of a relay function of the determined relay node according to the device-to-device communication relay configuration information.

13. A network control node for realizing device-to-device communication relay selection, comprising a memory storing instructions and a processor configured to execute the instructions to:
  receive relay-related information sent by the user equipment, and determine a relay node; and
  send device-to-device communication relay configuration information to the determined relay node;
  wherein the relay-related information comprises:
    an indication that the user equipment supports device-to-device communication relay; and/or
    a remaining power level of the user equipment; and/or
    a device-to-device communication group to which the user equipment belongs; and/or
    a measurement result of measurement performed by the user equipment to a serving cell and/or an adjacent cell;
  wherein the processor is configured to:
  before receiving the relay-related information sent by the user equipment, send or preconfigure a relay reception resource pool and/or a relay threshold to the user equipment through broadcasting, such that the user equipment monitors the relay reception resource pool;
  wherein the relay threshold information comprises: a link quality measurement minimum threshold of the serving cell, and/or a remaining power level threshold and/or a mobility state threshold.

* * * * *